United States Patent
Whyte et al.

(10) Patent No.: US 12,008,895 B2
(45) Date of Patent: Jun. 11, 2024

(54) VEHICLE-TO-EVERYTHING (V2X) MISBEHAVIOR DETECTION USING A LOCAL DYNAMIC MAP DATA MODEL

(71) Applicant: QUALCOMM Incorporated, San Diego, CA (US)

(72) Inventors: William Whyte, Natick, MA (US); Jonathan Petit, Wenham, MA (US); Cong Chen, Shrewsbury, MA (US); Jean-Philippe Monteuuis, Shrewsbury, MA (US)

(73) Assignee: QUALCOMM Incorporated, San Diego, CA (US)

( * ) Notice: Subject to any disclaimer, the term of this patent is extended or adjusted under 35 U.S.C. 154(b) by 344 days.

(21) Appl. No.: 17/483,593

(22) Filed: Sep. 23, 2021

(65) Prior Publication Data
US 2022/0230537 A1    Jul. 21, 2022

Related U.S. Application Data

(60) Provisional application No. 63/138,909, filed on Jan. 19, 2021.

(51) Int. Cl.
*G08G 1/01* (2006.01)
*G06V 20/56* (2022.01)
*H04W 4/40* (2018.01)

(52) U.S. Cl.
CPC .......... *G08G 1/0141* (2013.01); *G06V 20/56* (2022.01); *G08G 1/0145* (2013.01); *H04W 4/40* (2018.02)

(58) Field of Classification Search
None
See application file for complete search history.

(56) References Cited

U.S. PATENT DOCUMENTS

2017/0371349 A1* 12/2017 Kim ................. G08G 1/0133
2019/0143967 A1* 5/2019 Kutila ................ B60W 30/09
701/23

(Continued)

FOREIGN PATENT DOCUMENTS

WO    2020103524 A1    5/2020
WO    2020199134 A1    10/2020

OTHER PUBLICATIONS

Intelligent Transport Systems (ITS); Vehicular Communications; Basic Set of Applications, Local Dynamic Map (LDM); Rationale for and guidance on standardization, 2011, European Telecommunications Standards Institute (Year: 2011).*

(Continued)

*Primary Examiner* — Christian Chace
*Assistant Examiner* — Shayne M. Gilbertson
(74) *Attorney, Agent, or Firm* — The Marbury Law Group

(57) ABSTRACT

Embodiments include methods performed by a processor of a vehicle-to-everything (V2X) system within a vehicle for detecting misbehavior conditions by comparing information received in V2X messages to local dynamic map data. Various embodiments may include receiving V2X messages from other V2X system participants, determining whether a misbehavior condition is detected by comparing data contained in the received V2X messages to information in a locally maintained or stored local dynamic map data model, detecting a misbehavior condition and generating a misbehavior report identifying the misbehavior condition in response to a conflict or inconsistency between some data in the received V2X message and the local dynamic map.

29 Claims, 12 Drawing Sheets

(56) References Cited

U.S. PATENT DOCUMENTS

| | | | | |
|---|---|---|---|---|
| 2019/0220003 | A1* | 7/2019 | Sharma | G01C 21/3841 |
| 2019/0339082 | A1* | 11/2019 | Doig | G01C 21/3848 |
| 2020/0137580 | A1* | 4/2020 | Yang | H04W 4/46 |
| 2020/0257298 | A1* | 8/2020 | Ucar | G05D 1/0214 |
| 2021/0281986 | A1* | 9/2021 | Zhu | H04L 63/1425 |
| 2022/0221876 | A1* | 7/2022 | Staehlin | G08G 1/161 |
| 2023/0332920 | A1* | 10/2023 | Ogawa | G01C 21/3885 |

OTHER PUBLICATIONS

Rui Wang, Collaborative Caching for Dynamic Map Dissemination in Vehicular Networks 2019 (Year: 2019).*

Khajiev Nizomjon, Middleware structure using Local Dynamic Map within ITS Environment 2010 (Year: 2010).*

Qiang Liu, LiveMap: Real-Time Dynamic Map in Automotive Edge Computing 2021 (Year: 2021).*

"Intelligent Transport Systems (ITS), Vehicular Communications, Basic Set of Applications, Local Dynamic Map (LDM), Rationale for and Guidance on Standardization", Technical Report, European Telecommunications Standards Institute (ETSI), 650, Route Des Locioles, F-06921 Sophia-Antipolis, France, vol. ITS WG1, No. V1.1.1, Jun. 1, 2011 (Jun. 1, 2011), XP014065607, pp. 1-40, p. 8, Paragraph 4.1 p. 18, Paragraph 6.4.2.

International Search Report and Written Opinion—PCT/US2021/060919—ISA/EPO—dated Feb. 25, 2022 18 pages.

* cited by examiner

VEHICLE-TO-EVERYTHING (V2X) MISBEHAVIOR DETECTION USING A LOCAL DYNAMIC MAP DATA MODEL

RELATED APPLICATIONS

This application claims the benefit of priority of U.S. Provisional Application No. 63/138,909 entitled "Vehicle-to-Everything (V2X) Misbehavior Detection Using an LDM Data Model" filed Jan. 19, 2021, the entire contents of which are incorporated herein by reference for all purposes.

BACKGROUND

The cellular vehicle-to-everything (C-V2X) protocol serves as the foundation for vehicle-based wireless communications, and may be used to support intelligent highways, autonomous and semi-autonomous vehicles, and improve the overall efficiency and safety of the highway transportation systems. C-V2X defines two transmission modes that, together, provide a 360° non-line-of-sight awareness and a higher level of predictability for enhanced road safety and autonomous driving. A first transmission mode includes direct C-V2X, which includes vehicle-to-vehicle (V2V), vehicle-to-infrastructure (V2I), and vehicle-to-pedestrian (V2P), and that provides enhanced communication range and reliability in the dedicated Intelligent Transportation System (ITS) 5.9 gigahertz (GHz) spectrum that is independent of a cellular network. A second transmission mode includes vehicle-to-network communications (V2N) in mobile broadband systems and technologies, such as third generation wireless mobile communication technologies (3G) (e.g., global system for mobile communications (GSM) evolution (EDGE) systems, code division multiple access (CDMA) 2000 systems, etc.), fourth generation wireless mobile communication technologies (4G) (e.g., long term evolution (LTE) systems, LTE-Advanced systems, mobile Worldwide Interoperability for Microwave Access (mobile WiMAX) systems, etc.), fifth generation wireless mobile communication technologies (5G NR systems, etc.), etc. Other V2X wireless technologies are also under consideration in different regions of the world. The techniques described in this patent are applicable to any V2X wireless technology.

Multiple regions of the world are developing standards for vehicle-based communication systems and functionality, for example Institute of Electrical and Electronics Engineers (IEEE) standard 1609 and Society of Automotive Engineers (SAE) standards developed for use in North America, or in European Telecommunications Standards Institute (ETSI) and European Committee on Standardization (CEN) standards developed for use in Europe. Part of that system is the ability for a vehicle to broadcast Basic Safety Messages (BSM) in North America or Cooperative Awareness Messages (CAM) in Europe that other vehicles can receive and process to improve traffic safety. The processing of such messages in the transmitting and receiving vehicles occurs in onboard equipment that provide the V2X functionality (referred to herein as "V2X onboard equipment").

SUMMARY

Various aspects include methods performed by a misbehavior management system operating on a V2X equipment processor to detect misbehavior conditions in received V2X messages by comparing the data in the received V2X messages to data contained in a locally maintained or stored local dynamic map (LDM) data model. This LDM aggregates and synthesizes information received by the V2X system participant from all relevant inputs (including but not limited to V2X messages and local sensor inputs) to create a model of the local environment around the V2X system participant. The LDM may be updated based on the observed dynamics of objects tracked in the LDM, as well as based on new inputs.

Various aspects may include receiving a V2X message from another V2X system participants in which the V2X message contains data regarding the environment surrounding the vehicle, comparing data contained in the received V2X message to data within a locally maintained or stored local dynamic map (LDM) data model to detect misbehavior conditions, generating a misbehavior report identifying a misbehavior condition in response to detecting the misbehavior condition based on the comparison, and transmitting the generated misbehavior report to a misbehavior managing authority.

Some aspects may include monitoring a plurality of sensors in the vehicle to collect additional data regarding an environment surrounding the vehicle, generating the LDM data model representing the environment surrounding the vehicle based at least in part on an aggregation of the additional data collected from the plurality of sensors, and maintaining or storing the LDM data model in local memory.

Some aspects may include further include in response to determining that a misbehavior condition is not detected: performing calculations based on at least one of observed dynamics of objects in the LDM data model or on new data input received from the V2X message; modifying the LDM data model to incorporate the calculations and data included in the received V2X message; and replacing the LDM data model maintained or stored in memory with the modified LDM model.

In some aspects, transmitting the generated misbehavior report to a misbehavior managing authority may include transmitting a representation of the LDM data model.

In some aspects, the representation of the LDM data model may include an incomplete data set for the LDM data model.

Some aspects may include further include receiving feedback from the misbehavior managing authority in which the feedback includes corrective measures to mitigate the misbehavior condition.

In some aspects, the data regarding the environment surrounding the vehicle included in the received V2X message may include traffic information. In some aspects, the data regarding the environment surrounding the vehicle included in the received V2X message includes location information of neighboring vehicles based on global navigation satellite system (GNSS) (e.g., Global Position System (GPS)) data. In some aspects, the data regarding the environment surrounding the vehicle included in the received V2X message includes map data that specifies road geometry and street furniture.

In some aspects, comparing data included in the received V2X message to the locally maintained or locally maintained or stored LDM data model to detect misbehavior conditions may include determining whether any data included in the received V2X message conflicts with information in the locally maintained or stored LDM data model.

In some aspects, comparing data included in the received V2X message to the locally maintained or stored LDM data model to detect misbehavior conditions may include selecting a subset of data elements within the locally maintained or stored LDM data model for comparison to data included in the received V2X message; and determining whether any data included in the received V2X message conflicts with the selected subset of data elements within the locally maintained or stored LDM data model.

In some aspects, comparing data included in the received V2X message to the locally maintained or stored LDM data model to detect misbehavior conditions may include determining whether status or location information of a neighboring vehicle that transmitted the received V2X message conflicts with status or location information of the neighboring vehicle in the locally maintained or stored LDM data model.

Further aspects may include V2X equipment having a processor configured to perform one or more operations of the methods summarized above. Further aspects may include a non-transitory processor-readable storage medium having stored thereon processor-executable instructions configured to cause a processor of V2X equipment to perform operations of the methods summarized above. Further aspects include V2X equipment having means for performing functions of the methods summarized above.

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

DETAILED DESCRIPTION

Figure 1A:
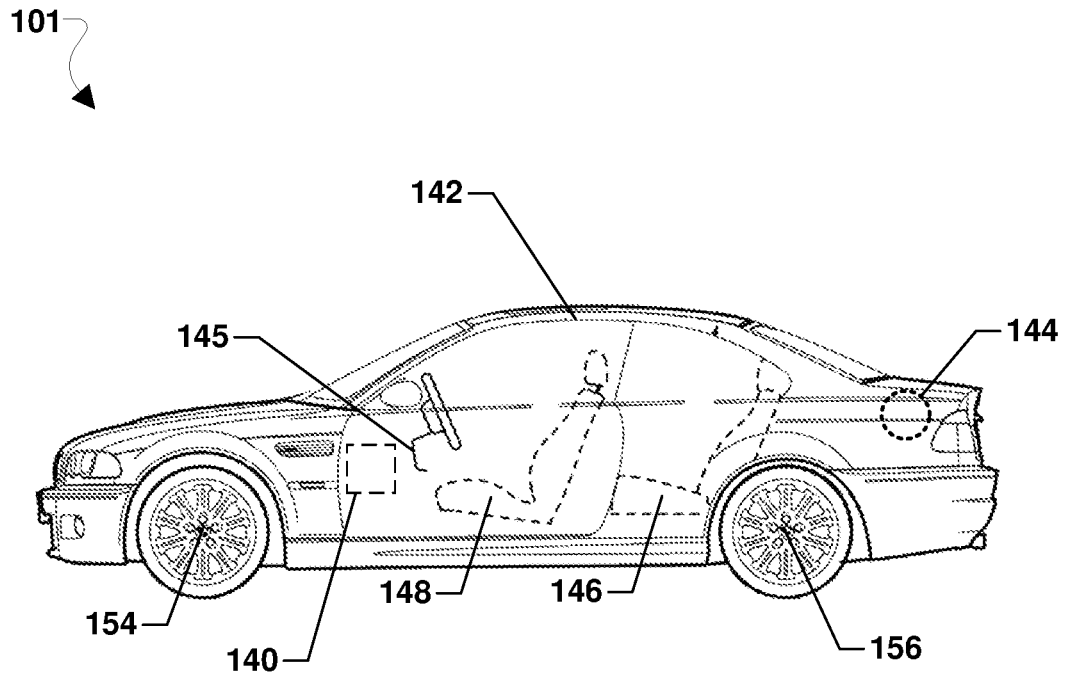
FIGS. 1A and 1B are component block diagrams illustrating a vehicle suitable for implementing various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

In V2X communications, it is important that inaccurate, corrupted, or hacked (i.e., bad) data is detected in order to prevent such inaccurate data from further dissemination. If V2X equipment is sending inaccurate, corrupted, or hacked (i.e., bad) data, the consequences may simply be mild inconvenience and traffic congestion, but could also be life threatening. Therefore, it is desirable to subject the detection of misbehavior conditions to a rigorous analysis against a comprehensive set of information to insure any such misbehavior conditions are detected reliably.

The term "mobile device" is used herein to refer to any one or all of wireless router devices, wireless appliances, cellular telephones, smartphones, portable computing devices, personal or mobile multi-media players, laptop computers, tablet computers, smartbooks, ultrabooks, palm-top computers, wireless electronic mail receivers, multimedia Internet-enabled cellular telephones, medical devices and equipment, biometric sensors/devices, wearable devices including smart watches, smart clothing, smart glasses, smart wrist bands, smart jewelry (e.g., smart rings, smart bracelets, etc.), entertainment devices (e.g., wireless gaming controllers, music and video players, satellite radios, etc.), wireless-network enabled Internet of Things (IoT) devices including smart meters/sensors, industrial manufacturing equipment, large and small machinery and appliances for home or enterprise use, wireless communication elements within autonomous and semiautonomous vehicles, mobile devices affixed to or incorporated into various mobile platforms, global positioning system devices, and similar electronic devices that include a memory, wireless communication components and a programmable processor.

The term "system on chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "system in a package" (SIP) may be used herein to refer to a single module or package that contains multiple resources, computational units, cores and/or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP may also include multiple independent SOCs coupled together via high speed communication circuitry and packaged in close proximity, such as on a single motherboard or in a single mobile device. The proximity of the SOCs facilitates high speed communications and the sharing of memory and resources.

As used in this application, the terms "component," "system," "unit," "module," and the like include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a communication device and the communication device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known computer, processor, and/or process related communication methodologies.

In overview, various embodiments include methods and mechanisms for detecting misbehavior conditions by a V2X system participant by comparing received V2X message to a vehicle's local dynamic map (LDM) data model and determining whether inconsistencies exist between the data received in the V2X message and the locally maintained or stored LDM data model.

V2X systems and technologies hold great promise for improving traffic flows and vehicle safety by enabling vehicles to share information regarding their location, speed, direction of travel, braking, and other factors that may be useful to other vehicles for anti-collision and other safety functions. Vehicles equipped with V2X/V2V onboard equipment will frequently (e.g. up to 20 times per second) transmit their vehicle information in packets referred to as Basic Safety Messages (BSM) or CAM. With all V2X equipped vehicles transmitting such BSM/CAM messages, all receiving vehicles have the information required to control their own speed and direction to avoid collisions and efficiently and safely position vehicles with respect to each other. It is envisioned that V2X equipped vehicles may be able to improve traffic flow by safely reducing separation distances, platooning several vehicles together, and avoiding vehicles experiencing breakdowns.

For ease of reference, some of the embodiments are described in this application using a Misbehavior Management System operating within V2X terminologies. However, it should be understood that various embodiments encompass any or all of the V2X/V2V or vehicle-based communication standards, messages or technologies. As such, nothing in the application should be construed to limit the claims to V2X/V2V systems unless expressly recited as such in the claims. In addition, the embodiments described herein discuss onboard equipment to perform V2X/V2V communication. In V2X/V2V systems, system participant equipment may include, but is not limited to, vehicle onboard equipment, mobile devices, and roadside units (RSU). RSUs may include stationary devices such as traffic signals, roadside beacons, traffic cameras, etc. Each of system participant equipment may broadcast information to other system participant equipment. The V2X communication among system participant equipment may allow applications executing on each system participant equipment to provide vehicles with safety applications (e.g., applications that may determine imminent hazards such as a vehicle hard-braking or speeding out of a blind cross-street) or mobility (planning for traffic signal changes), or provide other useful functions within the vehicular transportation system as a whole.

A local dynamic map (LDM) is a data model that is typically constructed by a mobile device to support navigation within its environment. The mobile device obtains information about its environment from one or more sensors, and may receive other LDM data from other mobile devices (e.g., via a V2X communications system) or from a network element such as a cloud-based server, and uses such data to construct its LDM. The LDM may be a dynamic data model that evolves over time even if no new data is received that updates the position of other V2X system participants via dead-reckoning rather than by messages from those other V2X system participants. This LDM data model may aggregate and synthesize information received by the V2X system participant from all relevant inputs (including but not limited to V2X messages and sensor input) to create a model of the local environment around the V2X system participant. The LDM may be updated based on the observed dynamics of objects tracked in the LDM, as well as being updated based on new inputs.

A misbehavior management system operating on a V2X participant's equipment may construct an LDM by aggregating information obtained from one or more sensors (e.g., cameras, radar, LIDAR, etc.) of the host vehicle, from one or more other mobile devices or vehicles received via V2X messages, and/or from remote data sources and network elements such as cloud-based servers, such as via road side units. The vehicle V2X system may process this information to generate and update the locally maintained or stored LDM data in a useable or presentable form, such as a digital map. Portions of the LDM map may also be received from external sources, such as computing devices capable of performing intensive processing operations. Such an LDM data model may include many types of information, which may be structured or organized in a number of layers or data elements. For example, an LDM data model may include a physical map of the roadway, such as downloaded from a map database, a data layer of observed roadway conditions (e.g., rough or smooth, wet, dry or icy, etc.), a data layer of observed other vehicle positions and velocities, a data layer of network reported roadway alterations (e.g., construction, closed lanes), a data layer regarding traffic signal in the vicinity (e.g., time of light cycles in traffic lights ahead of the ego vehicle), and other information that is useful for autonomous driving, collision avoidance, and general safety functions (e.g., driver alerts).

The information used by a misbehavior management system is typically limited to data that can be maintained or stored in memory (e.g., static maps) and data from onboard sensors. LDM data received from onboard sensors and from other mobile devices may be limited by the sensitivity, field of view and perceptual limits of each sensor. LDM data received from distant network elements typically does not include very recent changes in the environment near the vehicle of mobile device, and so may not reflect highly dynamic environmental conditions (e.g., road closures, construction, accidents, etc.). By combining all sources of information regarding the roadway ahead of the vehicle, as well as other vehicles in the vicinity, vehicle systems (e.g., a misbehavior management system) may generate a more comprehensive LDM data model that is useful for complex processes, such as autonomous driving and semi-autonomous driver assistance functions.

LDM data models may be structured in a variety of types reflecting a degree to which such information may change dynamically. For example, LDM data may be classified (for example, in relevant ETSI standards) as: Type 1 for permanent static information, such as the locations of roads and geographic features, this may be considered map data; Type 2 for transient static information, this may include signals not included in map data such as speed limits; Type 3 for transient dynamic information, such as weather and traffic congestion and other traffic condition information; and Type 4 for highly dynamic information, such as automotive sensor data, locations of other vehicles in motion, pedestrians, parked vehicles, the state of traffic signals, and other highly transient conditions. Examples of LDM implementations have been reported including PG-LDM by Bosch™ and Tele Atlas™ and NAVTEQ-LDM by NAVTEQ™. The PG-LDM implementation adopts PostgreSQL as its database engine and provides for PostGIS stored procedures and spatial operations. The NAVTEQ-LDM implementation, meanwhile, adopts SQLite as its database engine.

In various embodiments, a misbehavior management system operating on a V2X equipment processor may receive the first LDM data from one or more data sources other than V2X system participants which may include neighboring vehicles, mobile devices and RSUs, data sources that may transmit CAM messages or Decentralized Environmental Notification Message (DENM) messages, and a variety of Internet- or cloud-based resources. In some embodiments, the received first LDM data may be Type 4 information, or "highly dynamic" information, that reflects highly transient conditions. In some embodiments, the received LDM data may be obtained from a sensor or another information source within a threshold amount of time, such as two seconds, one second, 250 milliseconds, or another suitable threshold or window of time. In some embodiments, the first LDM data may include data gathered by a plurality of sensors quipped on vehicles and mobile device. Such as sensor data may include data such a speed, temperature, revolutions per minute, GPS location, image data, audio data, or vehicle/device operating state data. The misbehavior management system may aggregate all of the collected sensor data along with the received V2X message data to generate an LDM data model that represents the environment surrounding the V2X participant. For ease of reference, the various embodiments are described referring to the environment surrounding the V2X participant as the environment surrounding the vehicle; however, the V2X participant may be other equipment outside of a vehicle, such as RSU and other stationary equipment.

An LDM data model generated in this manner may be useful for evaluating the accuracy or veracity of information included in received V2X message. Because an LDM data model may be composed from data received from a variety of information sources, it may include one or more data elements that are relevant to information provided in a V2X message. However, not all information included in an LDM data model may be relevant to information in a V2X message that is to be verified or validated.

Figure 1B:
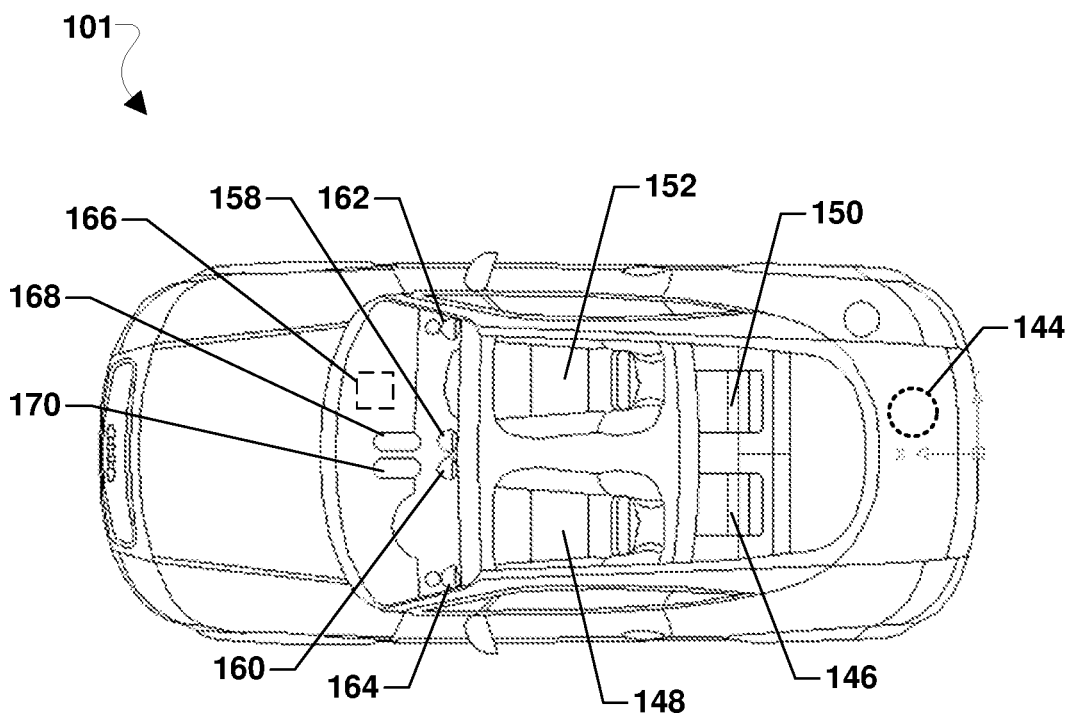

Various embodiments may be implemented within a variety of vehicles, an example vehicle 101 of which is illustrated in FIGS. 1A and 1B. With reference to FIGS. 1A and 1B, a vehicle 101 may include a control unit 140 and a plurality of sensors 144-170, including satellite geopositioning system receivers 142, occupancy sensors 144, 146, 148, 150, 152, tire pressure sensors 154, 156, cameras 158, 160, microphones 162, 164, impact sensors 166, radar 168, and lidar 170. The plurality of sensors 144-170, disposed in or on the vehicle, may be used for various purposes, such as autonomous and semi-autonomous navigation and control, crash avoidance, position determination, etc., as well to provide sensor data regarding objects and people in or on the vehicle 101. The sensors 144-170 may include one or more of a wide variety of sensors capable of detecting a variety of information useful for navigation and collision avoidance. Each of the sensors 144-170 may be in wired or wireless communication with a control unit 140, as well as with each other. In particular, the sensors may include one or more cameras 158, 160 or other optical sensors or photo optic sensors. The sensors may further include other types of object detection and ranging sensors, such as radar 168, lidar 170, IR sensors, and ultrasonic sensors. The sensors may further include tire pressure sensors 154, 156, humidity sensors, temperature sensors, satellite geopositioning sensors 142, control input sensors 145, accelerometers, vibration sensors, gyroscopes, gravimeters, impact sensors 166, force meters, stress meters, strain sensors, fluid sensors, chemical sensors, gas content analyzers, pH sensors, radiation sensors, Geiger counters, neutron detectors, biological material sensors, microphones 162, 164, occupancy sensors 144, 146, 148, 150, 152, proximity sensors, and other sensors.

The vehicle control unit 140 may be configured with processor-executable instructions to perform navigation and collision avoidance operations using information received from various sensors, particularly the cameras 158, 160. In some embodiments, the control unit 140 may supplement the processing of camera images using distance and relative position (e.g., relative bearing angle) that may be obtained from radar 168 and/or lidar 170 sensors. The control unit 140 may further be configured to control steering, breaking and speed of the vehicle 101 when operating in an autonomous or semi-autonomous mode using information regarding other vehicles determined using various embodiments.

Figure 1C:
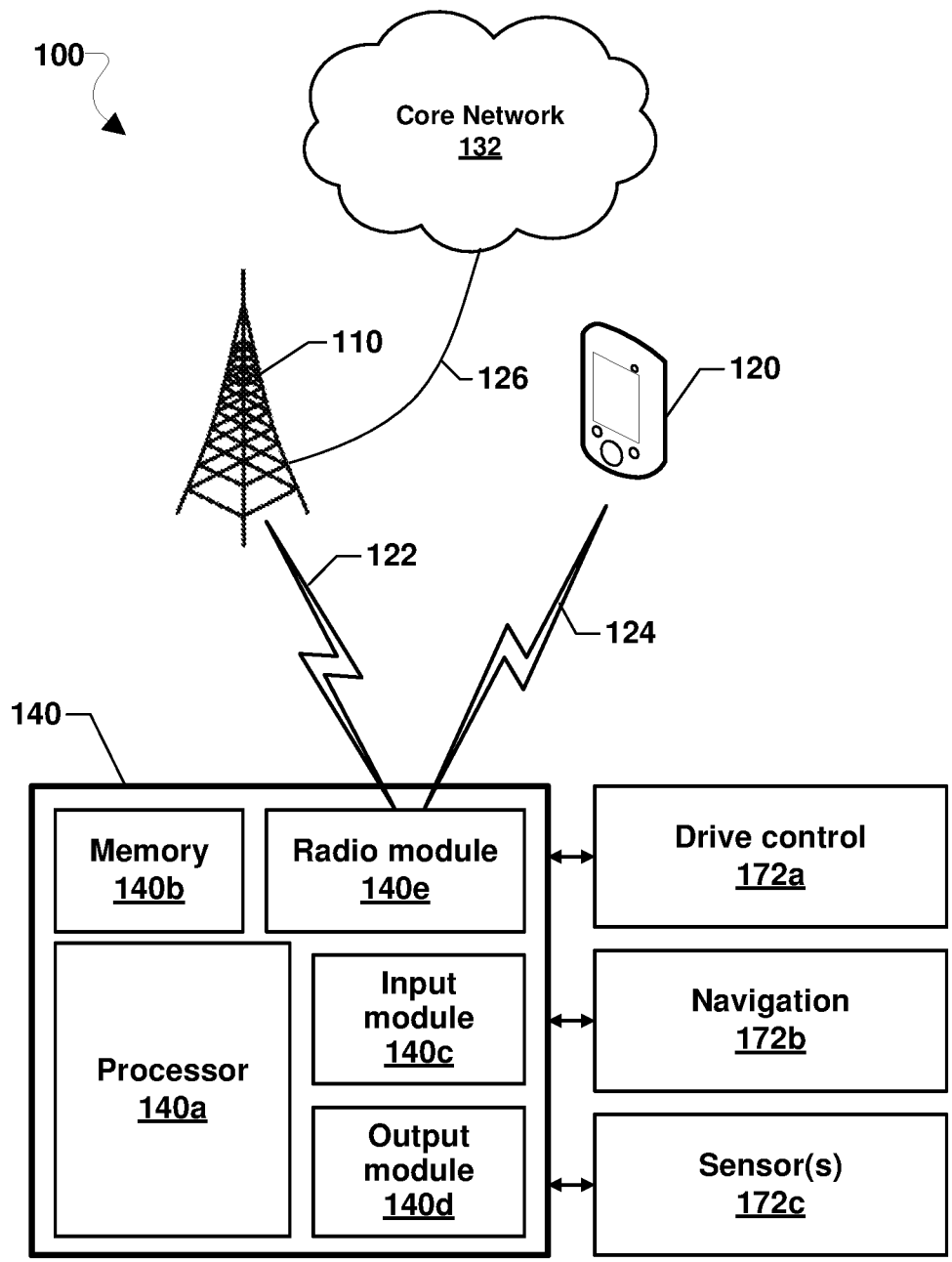
FIG. 1C is a component block diagram illustrating components of a vehicle suitable for implementing various embodiments.

FIG. 1C is a component block diagram illustrating a communication system 100 of components and support systems suitable for implementing various embodiments. With reference to FIGS. 1A-1C, a vehicle 101 may include a control unit 140, which may include various circuits and devices used to control the operation of the vehicle 101. In the example illustrated in FIG. 1D the control unit 140 includes a processor 140a, memory 140b, an input module 140c, an output module 140d and a radio module 140e. The control unit 140 may be coupled to and configured to control drive control components 172a, navigation components 172b, and one or more sensors 172c of the vehicle 101. The processor 140a that may be configured with processor-executable instructions to control maneuvering, navigation, and/or other operations of the vehicle 101, including operations of various embodiments. The processor 140a may be coupled to the memory 140b.

The radio module 140e may be configured for wireless communication. The radio module 140e may exchange signals (e.g., command signals for controlling maneuvering, signals from navigation facilities, etc.) via the communication link 122 with a network transceiver (e.g., the base station 110), and may provide the signals to the processor 140a and/or the navigation unit 172b. In some embodiments, the radio module 140e may enable the vehicle 101 to communicate with a wireless communication device 120 through the wireless communication link 124. The wireless communication link 124 may be a bidirectional or unidirectional communication link, and may use one or more communication protocols, as described.

The input module 140c may receive sensor data from one or more vehicle sensors 172c as well as electronic signals from other components, including the drive control components 172a and the navigation components 172b. The output module 140d may communicate with or activate various components of the vehicle 101, including the drive control components 172a, the navigation components 172b, and the sensor(s) 172c.

The control unit 140 may be coupled to the drive control components 172a to control physical elements of the vehicle 101 related to maneuvering and navigation of the vehicle, such as the engine, motors, throttles, steering elements, flight control elements, braking or deceleration elements, and the like. The drive control components 172a may also include components that control other devices of the vehicle, including environmental controls (e.g., air conditioning and heating), external and/or interior lighting, interior and/or exterior informational displays (which may include a display screen or other devices to display information), safety devices (e.g., haptic devices, audible alarms, etc.), and other similar devices.

The control unit 140 may be coupled to the navigation components 172b, and may receive data from the navigation components 172b and be configured to use such data to determine the present position and orientation of the vehicle 101, as well as an appropriate course toward a destination. The navigation components 172b may include or be coupled to a GNSS receiver system (e.g., one or more GPS receivers) enabling the vehicle 101 to determine its current position using GNSS signals. Alternatively, or in addition, the navigation components 172b may include radio navigation receivers for receiving navigation beacons or other signals from radio nodes, such as Wi-Fi access points, cellular network sites, radio station, remote computing devices, other vehicles, etc. Through control of the drive control elements 172a, the processor 140a may control the vehicle 101 to navigate and maneuver. The processor 140a and/or the navigation components 172b may be configured to communicate with a network element such as a server in a communication network (e.g., the core network 132) via the wireless communication link 122, 126 to receive commands to control maneuvering, receive data useful in navigation, provide real-time position reports, and assess other data.

The control unit 140 may be coupled to one or more sensors 172c. The sensor(s) 172c may include the sensors 144-170 as described, and may the configured to provide a variety of data to the processor 140a.

While the control unit 140 is described as including separate components, in some embodiments some or all of the components (e.g., the processor 140a, the memory 140b, the input module 140c, the output module 140d, and the radio module 140e) may be integrated in a single device or module, such as a system-on-chip (SOC) processing device. Such an SOC processing device may be configured for use in vehicles and be configured, such as with processor-executable instructions executing in the processor 140a, to perform operations of navigation and collision avoidance using LDM data when installed in a vehicle.

Figure 1D:
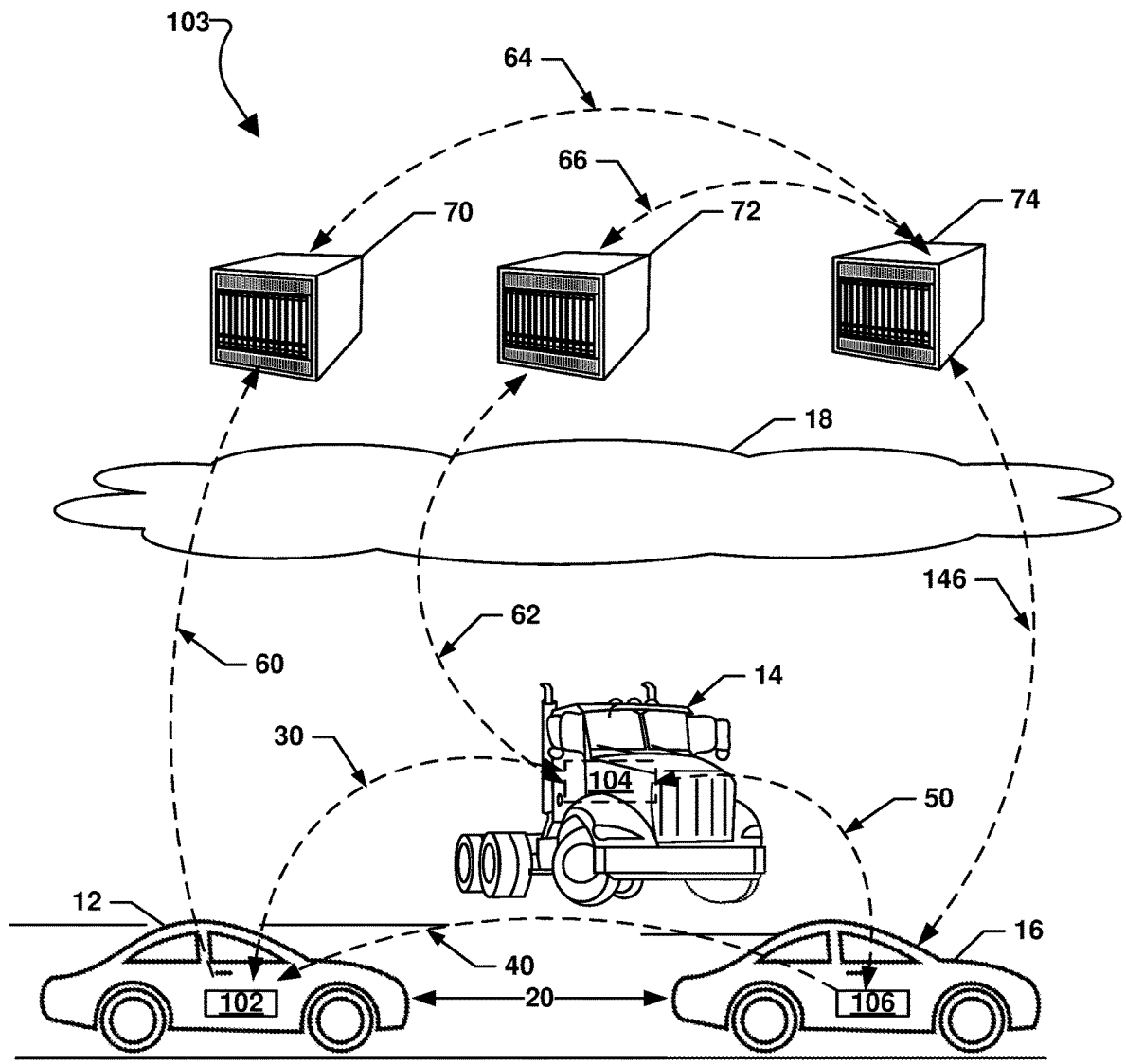
FIG. 1D is a schematic block diagram illustrating a subset of a V2X communication system suitable for implementing various embodiments.

FIG. 1D illustrates a portion of the V2X system 103 including three vehicles, 12, 14, 16. In the illustrated example, each vehicle 12, 14, 16 includes V2X onboard equipment 102, 104, 106, respectively, that are configured to periodically broadcast Basic Safety Messages 30, 40, 50 for receipt and processing by other vehicles' onboard equipment (e.g., 102, 104, 106). By sharing the vehicle location, speed, direction, braking, and other information, vehicles can maintain safe separation and identify and avoid potential collisions. For example, a trailing vehicle 12 receiving Basic Safety Messages 40 from a leading vehicle 16 can determine the speed and location of the vehicle 16, which in turn enables vehicle 12 to match the speed and maintain a safe separation distance 20. By being informed through Basic Safety Messages 40 when the leading vehicles 16 applies the brakes, the V2X equipment 102 in the trailing vehicle 12 can apply brakes simultaneously to maintain the safe separation distance 20 even when the leading vehicle 16 stops suddenly. As another example, the V2X equipment 104 within the truck vehicle 14 may receive Basic Safety Messages 30, 50 from the two vehicles 12, 16, and thus be informed that the truck vehicle 14 should stop at the intersection to avoid a collision. Each of the vehicle V2X on-board equipment 102, 104, 106 may communicate with one another using any of a variety close proximity communication protocols. In addition, the vehicles may be able to transmit data and information regarding detected Basic Safety Messages as well as detected misbehavior reports to an original equipment manufacturer (OEM) (70, 72) and/or remote misbehavior managing authority 74 via communication links 60, 62 through a communication network 18 (e.g., cellular, WiFi, etc.) The MBR may be transmitted directly to the misbehavior managing authority 74 (e.g., through communication link 64, 66). In other embodiments, the MBR may first be transmitted to a MBR pre-processing unit such as the OEM servers 70, 72 for pre-processing through communication links 64, 66. Then the pre-processed MBR may be transmitted from the MBR pre-processing servers 70, 72 to the misbehavior managing authority 74 through communication links 64, 66.

Figure 2A:
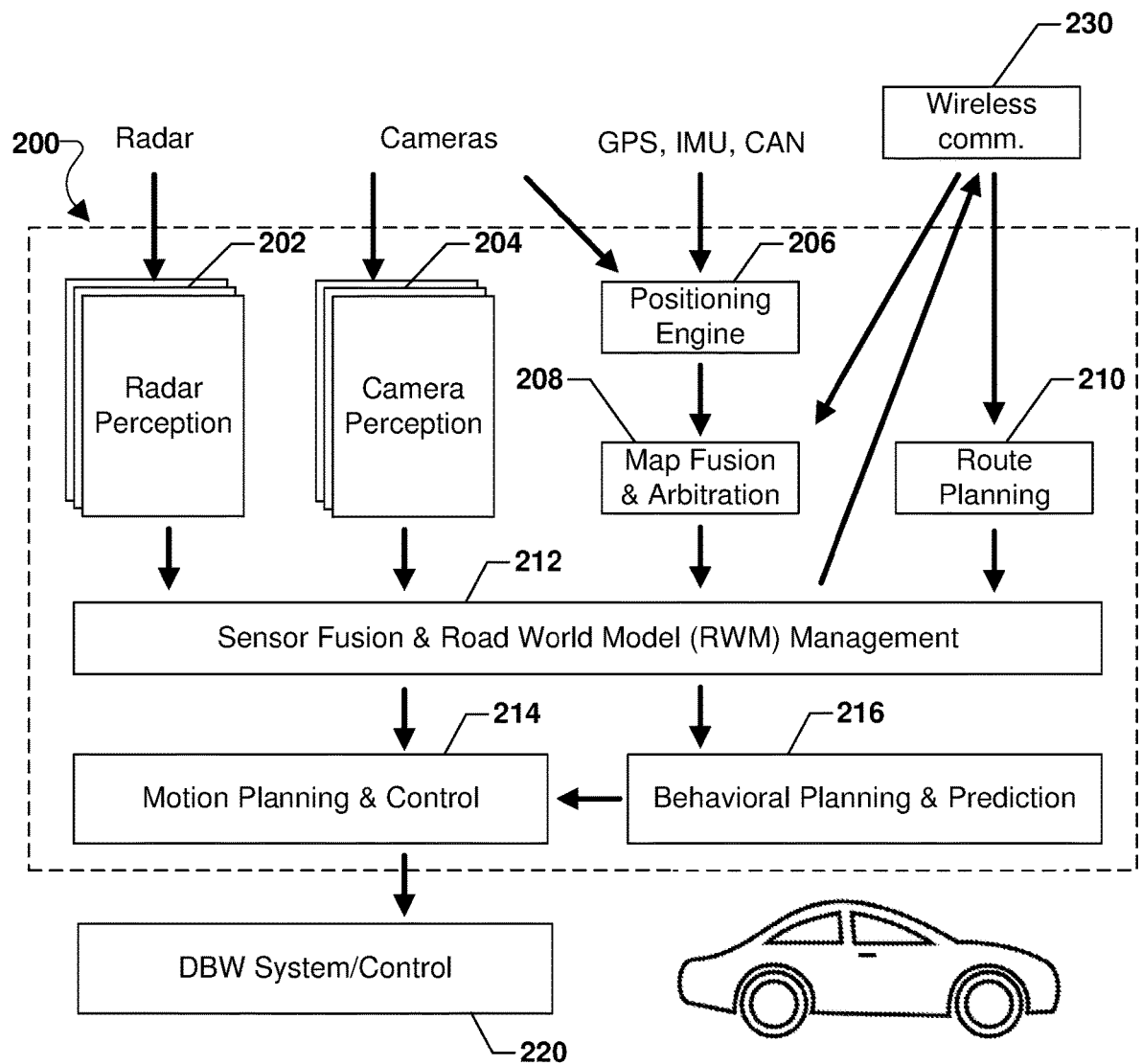
FIG. 2A is a component block diagram illustrating components of an example vehicle management system according to various embodiments.

FIG. 2A is a component block diagram illustrating components of an example misbehavior management system 200. The vehicle management system 200 may include various subsystems, communication elements, computational elements, computing devices or units which may be utilized within a vehicle 101. With reference to FIGS. 1A-2A, the various computational elements, computing devices or units within misbehavior management system 200 may be implemented within a system of interconnected computing devices (i.e., subsystems), that communicate data and commands to each other (e.g., indicated by the arrows in FIG. 2A). In some implementations, the various computational elements, computing devices or units within misbehavior management system 200 may be implemented within a single computing device, such as separate threads, processes, algorithms or computational elements. Therefore, each subsystem/computational element illustrated in FIG. 2A is also generally referred to herein as "layer" within a computational "stack" that constitutes the misbehavior management system 200. However, the use of the terms layer and stack in describing various embodiments are not intended to imply or require that the corresponding functionality is implemented within a single autonomous (or semi-autonomous) vehicle management system computing device, although that is a potential implementation embodiment. Rather the use of the term "layer" is intended to encompass subsystems with independent processors, computational elements (e.g., threads, algorithms, subroutines, etc.) running in one or more computing devices, and combinations of subsystems and computational elements.

The misbehavior management system stack may include a radar perception layer 202, a camera perception layer 204, a positioning engine layer 206, a map fusion and arbitration layer 208, a route planning layer 210, sensor fusion and road world model (RWM) management layer 212, motion planning and control layer 214, and behavioral planning and prediction layer 216. The layers 202-216 are merely examples of some layers in one example configuration of the misbehavior management system stack 200. In other configurations, other layers may be included, such as additional layers for other perception sensors (e.g., LIDAR perception layer, etc.), additional layers for planning and/or control, additional layers for modeling, etc., and/or certain of the layers 202-216 may be excluded from the misbehavior management system stack 200. Each of the layers 202-216 may exchange data, computational results and commands as illustrated by the arrows in FIG. 2A. Further, the misbehavior management system stack 200 may receive and process data from sensors (e.g., radar, lidar, cameras, inertial measurement units (IMU) etc.), navigation systems (e.g., GPS receivers, IMUs, etc.), vehicle networks (e.g., Controller Area Network (CAN) bus), and databases in memory (e.g., digital map data). The misbehavior management system stack 200 may output vehicle control commands or signals to the drive by wire (DBW) system/control unit 220, which is a system, subsystem or computing device that interfaces directly with vehicle steering, throttle and brake controls. The configuration of the misbehavior management system stack 200 and DBW system/control unit 220 illustrated in FIG. 2A is merely an example configuration and other configurations of a vehicle management system and other vehicle components may be used. As an example, the configuration of the misbehavior management system stack 200 and DBW system/control unit 220 illustrated in FIG. 2A may be used in a vehicle configured for autonomous or semi-autonomous operation while a different configuration may be used in a non-autonomous vehicle.

The radar perception layer 202 may receive data from one or more detection and ranging sensors, such as radar (e.g., 132) and/or lidar (e.g., 138), and process the data to recognize and determine locations of other vehicles and objects within a vicinity of the vehicle 100. The radar perception layer 202 may include use of neural network processing and artificial intelligence methods to recognize objects and vehicles, and pass such information on to the sensor fusion and RWM management layer 212.

The camera perception layer 204 may receive data from one or more cameras, such as cameras (e.g., 158, 160), and process the data to recognize and determine locations of other vehicles and objects within a vicinity of the vehicle 100. The camera perception layer 204 may include use of neural network processing and artificial intelligence methods to recognize objects and vehicles, and pass such information on to the sensor fusion and RWM management layer 212.

The positioning engine layer 206 may receive data from various sensors and process the data to determine a position of the vehicle 100. The various sensors may include, but is not limited to, GPS sensor, an IMU, and/or other sensors connected via a CAN bus. The positioning engine layer 206 may also utilize inputs from one or more cameras, such as cameras (e.g., 158, 160) and/or any other available sensor, such as radars, LIDARs, etc.

The misbehavior management system 200 may include or be coupled to a vehicle wireless communication subsystem 230. The wireless communication subsystem 230 may be configured to communicate with other vehicle computing devices and highway communication systems, such as via vehicle-to-vehicle (V2V) communication links and/or to remote information sources, such as cloud-based resources, via cellular wireless communication systems, such as 5G networks. In various embodiments, the wireless communication subsystem 230 may communicate with other V2X system participants via wireless communication links to receive LDM data.

The map fusion and arbitration layer 208 may access LDM data received from other V2X system participants and receive output received from the positioning engine layer 206 and process the data to further determine the position of the vehicle 101 within the map, such as location within a lane of traffic, position within a street map, etc. LDM data may be maintained or stored in a memory of the vehicle (e.g., memory 432). For example, the map fusion and arbitration layer 208 may convert latitude and longitude information from GPS into locations within a surface map of roads within in the LDM data. GPS position fixes include errors, so the map fusion and arbitration layer 208 may function to determine a best guess location of the vehicle within a roadway based upon an arbitration between the GPS coordinates and the LDM data. For example, while GPS coordinates may place the vehicle near the middle of a two-lane road in the LDM data, the map fusion and arbitration layer 208 may determine from the direction of travel that the vehicle is most likely aligned with the travel lane consistent with the direction of travel. The map fusion and arbitration layer 208 may pass map-based location information to the sensor fusion and RWM management layer 212.

The route planning layer 210 may utilize LDM data, as well as inputs from an operator or dispatcher to plan a route to be followed by the vehicle 101 to a particular destination. The route planning layer 210 may pass map-based location information to the sensor fusion and RWM management layer 212. However, the use of a prior map by other layers, such as the sensor fusion and RWM management layer 212, etc., is not required. For example, other stacks may operate and/or control the vehicle based on perceptual data alone without a provided map, constructing lanes, boundaries, and the notion of a local map as perceptual data is received.

The sensor fusion and RWM management layer 212 may receive data and outputs produced by the radar perception layer 202, camera perception layer 204, map fusion and arbitration layer 208, and route planning layer 210, and use some or all of such inputs to estimate or refine the location and state of the vehicle 101 in relation to the road, other vehicles on the road, and other objects within a vicinity of the vehicle 100. For example, the sensor fusion and RWM management layer 212 may combine imagery data from the camera perception layer 204 with arbitrated map location information from the map fusion and arbitration layer 208 to refine the determined position of the vehicle within a lane of traffic. As another example, the sensor fusion and RWM management layer 212 may combine object recognition and imagery data from the camera perception layer 204 with object detection and ranging data from the radar perception layer 202 to determine and refine the relative position of other vehicles and objects in the vicinity of the vehicle. As another example, the sensor fusion and RWM management layer 212 may receive information from vehicle-to-vehicle (V2V) communications (such as via the CAN bus) regarding other vehicle positions and directions of travel, and combine that information with information from the radar perception layer 202 and the camera perception layer 204 to refine the locations and motions of other vehicles. The sensor fusion and RWM management layer 212 may output refined location and state information of the vehicle 100, as well as refined location and state information of other vehicles and objects in the vicinity of the vehicle, to the motion planning and control layer 214 and/or the behavior planning and prediction layer 216.

As a further example, the sensor fusion and RWM management layer 212 may use dynamic traffic control instructions directing the vehicle 101 to change speed, lane, direction of travel, or other navigational element(s), and combine that information with other received information to determine refined location and state information. The sensor fusion and RWM management layer 212 may output the refined location and state information of the vehicle 101, as well as refined location and state information of other vehicles and objects in the vicinity of the vehicle 100, to the motion planning and control layer 214, the behavior planning and prediction layer 216 and/or devices remote from the vehicle 10, such as a data server, other vehicles, etc., via wireless communications, such as through C-V2X connections, other wireless connections, etc.

As a still further example, the sensor fusion and RWM management layer 212 may monitor perception data from various sensors, such as perception data from a radar perception layer 202, camera perception layer 204, other perception layer, etc., and/or data from one or more sensors themselves to analyze conditions in the vehicle sensor data. The sensor fusion and RWM management layer 212 may be configured to detect conditions in the sensor data, such as sensor measurements being at, above, or below a threshold, certain types of sensor measurements occurring, etc., and may output the sensor data as part of the refined location and state information of the vehicle 101 provided to the behavior planning and prediction layer 216 and/or devices remote from the vehicle 100, such as a data server, other vehicles, etc., via wireless communications, such as through C-V2X connections, other wireless connections, etc.

The refined location and state information may include vehicle descriptors associated with the vehicle and the vehicle owner and/or operator, such as: vehicle specifications (e.g., size, weight, color, on board sensor types, etc.); vehicle position, speed, acceleration, direction of travel, attitude, orientation, destination, fuel/power level(s), and other state information; vehicle emergency status (e.g., is the vehicle an emergency vehicle or private individual in an emergency); vehicle restrictions (e.g., heavy/wide load, turning restrictions, high occupancy vehicle (HOV) authorization, etc.); capabilities (e.g., all-wheel drive, four-wheel drive, snow tires, chains, connection types supported, on board sensor operating statuses, on board sensor resolution levels, etc.) of the vehicle; equipment problems (e.g., low tire pressure, weak breaks, sensor outages, etc.); owner/operator travel preferences (e.g., preferred lane, roads, routes, and/or destinations, preference to avoid tolls or highways, preference for the fastest route, etc.); permissions to provide sensor data to a data agency server (e.g., 184); and/or owner/operator identification information.

The behavioral planning and prediction layer 216 of the autonomous vehicle system stack 200 may use the refined location and state information of the vehicle 101 and location and state information of other vehicles and objects output from the sensor fusion and RWM management layer 212 to predict future behaviors of other vehicles and/or objects. For example, the behavioral planning and prediction layer 216 may use such information to predict future relative positions of other vehicles in the vicinity of the vehicle based on own vehicle position and velocity and other vehicle positions and velocity. Such predictions may take into account information from the LDM data and route planning to anticipate changes in relative vehicle positions as host and other vehicles follow the roadway. The behavioral planning and prediction layer 216 may output other vehicle and object behavior and location predictions to the motion planning and control layer 214. Additionally, the behavior planning and prediction layer 216 may use object behavior in combination with location predictions to plan and generate control signals for controlling the motion of the vehicle 101. For example, based on route planning information, refined location in the roadway information, and relative locations and motions of other vehicles, the behavior planning and prediction layer 216 may determine that the vehicle 101 needs to change lanes and accelerate, such as to maintain or achieve minimum spacing from other vehicles, and/or prepare for a turn or exit. As a result, the behavior planning and prediction layer 216 may calculate or otherwise determine a steering angle for the wheels and a change to the throttle setting to be commanded to the motion planning and control layer 214 and DBW system/control unit 220 along with such various parameters necessary to effectuate such a lane change and acceleration. One such parameter may be a computed steering wheel command angle.

The motion planning and control layer 214 may receive data and information outputs from the sensor fusion and RWM management layer 212 and other vehicle and object behavior as well as location predictions from the behavior planning and prediction layer 216, and use this information to plan and generate control signals for controlling the motion of the vehicle 101 and to verify that such control signals meet safety requirements for the vehicle 100. For example, based on route planning information, refined location in the roadway information, and relative locations and motions of other vehicles, the motion planning and control layer 214 may verify and pass various control commands or instructions to the DBW system/control unit 220.

The DBW system/control unit 220 may receive the commands or instructions from the motion planning and control layer 214 and translate such information into mechanical control signals for controlling wheel angle, brake and throttle of the vehicle 100. For example, DBW system/control unit 220 may respond to the computed steering wheel command angle by sending corresponding control signals to the steering wheel controller.

In various embodiments, the wireless communication subsystem 230 may communicate with other V2X system participants via wireless communication links to transmit sensor data, position data, vehicle data and data gathered about the environment around the vehicle by onboard sensors. Such information may be used by other V2X system participants to update LDM data for relay to other V2X system participants.

In various embodiments, the misbehavior management system stack 200 may include functionality that performs safety checks or oversight of various commands, planning or other decisions of various layers that could impact vehicle and occupant safety. Such safety check or oversight functionality may be implemented within a dedicated layer or distributed among various layers and included as part of the functionality. In some embodiments, a variety of safety parameters may be stored in memory and the safety checks or oversight functionality may compare a determined value (e.g., relative spacing to a nearby vehicle, distance from the roadway centerline, etc.) to corresponding safety parameter(s), and issue a warning or command if the safety parameter is or will be violated. For example, a safety or oversight function in the behavior planning and prediction layer 216 (or in a separate layer) may determine the current or future separate distance between another vehicle (as defined by the sensor fusion and RWM management layer 212) and the vehicle (e.g., based on the world model refined by the sensor fusion and RWM management layer 212), compare that separation distance to a safe separation distance parameter stored in memory, and issue instructions to the motion planning and control layer 214 to speed up, slow down or turn if the current or predicted separation distance violates the safe separation distance parameter. As another example, safety or oversight functionality in the motion planning and control layer 214 (or a separate layer) may compare a determined or commanded steering wheel command angle to a safe wheel angle limit or parameter, and issue an override command and/or alarm in response to the commanded angle exceeding the safe wheel angle limit.

Some safety parameters stored in memory may be static (i.e., unchanging over time), such as maximum vehicle speed. Other safety parameters stored in memory may be dynamic in that the parameters may be determined or updated continuously or periodically based on vehicle state information and/or environmental conditions. Non-limiting examples of safety parameters include maximum safe speed, maximum brake pressure, maximum acceleration, and the safe wheel angle limit, all of which may be a function of roadway and weather conditions.

Figure 2B:
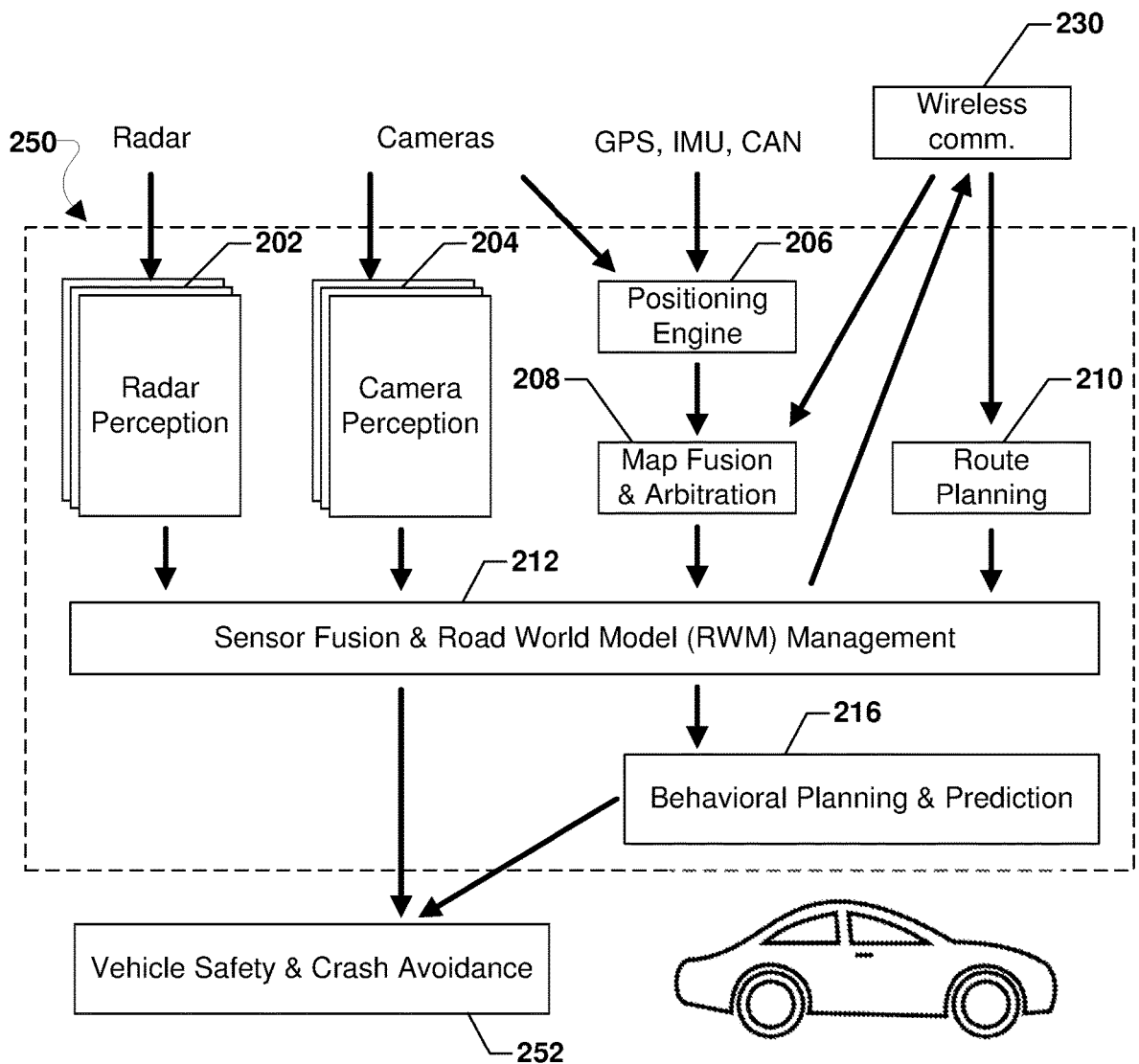
FIG. 2B is a component block diagram illustrating components of another example vehicle management system according to various embodiments

FIG. 2B illustrates an example of subsystems, computational elements, computing devices or units within a vehicle management system 250, which may be utilized within a vehicle 101. With reference to FIGS. 1A-2B, in some embodiments, the layers 202, 204, 206, 208, 210, 212, and 216 of the misbehavior management system stack 200 may be similar to those described with reference to FIG. 2A and the misbehavior management system stack 250 may operate similar to the misbehavior management system stack 200, except that the misbehavior management system stack 250 may pass various data or instructions to a vehicle safety and crash avoidance system 252 rather than the DBW system/control unit 220. For example, the configuration of the misbehavior management system stack 250 and the vehicle safety and crash avoidance system 252 illustrated in FIG. 2B may be used in a non-autonomous vehicle.

In various embodiments, the behavioral planning and prediction layer 216 and/or sensor fusion and RWM management layer 212 may output data to the vehicle safety and crash avoidance system 252. For example, the sensor fusion and RWM management layer 212 may output sensor data as part of refined location and state information of the vehicle 101 provided to the vehicle safety and crash avoidance system 252. The vehicle safety and crash avoidance system 252 may use the refined location and state information of the vehicle 101 to make safety determinations relative to the vehicle 101 and/or occupants of the vehicle 100. As another example, the behavioral planning and prediction layer 216 may output behavior models and/or predictions related to the motion of other vehicles to the vehicle safety and crash avoidance system 252. The vehicle safety and crash avoidance system 252 may use the behavior models and/or predictions related to the motion of other vehicles to make safety determinations relative to the vehicle 101 and/or occupants of the vehicle 101.

In various embodiments, the vehicle safety and crash avoidance system 252 may include functionality that performs safety checks or oversight of various commands, planning, or other decisions of various layers, as well as human driver actions, that could impact vehicle and occupant safety. In some embodiments, a variety of safety parameters may be stored in memory and the vehicle safety and crash avoidance system 252 may compare a determined value (e.g., relative spacing to a nearby vehicle, distance from the roadway centerline, etc.) to corresponding safety parameter(s), and issue a warning or command if the safety parameter is or will be violated. For example, a vehicle safety and crash avoidance system 252 may determine the current or future separate distance between another vehicle (as defined by the sensor fusion and RWM management layer 212) and the vehicle (e.g., based on the world model refined by the sensor fusion and RWM management layer 212), compare that separation distance to a safe separation distance parameter stored in memory, and issue instructions to a driver to speed up, slow down or turn if the current or predicted separation distance violates the safe separation distance parameter. As another example, a vehicle safety and crash avoidance system 252 may compare a human driver's change in steering wheel angle to a safe wheel angle limit or parameter, and issue an override command and/or alarm in response to the steering wheel angle exceeding the safe wheel angle limit.

Figure 3:
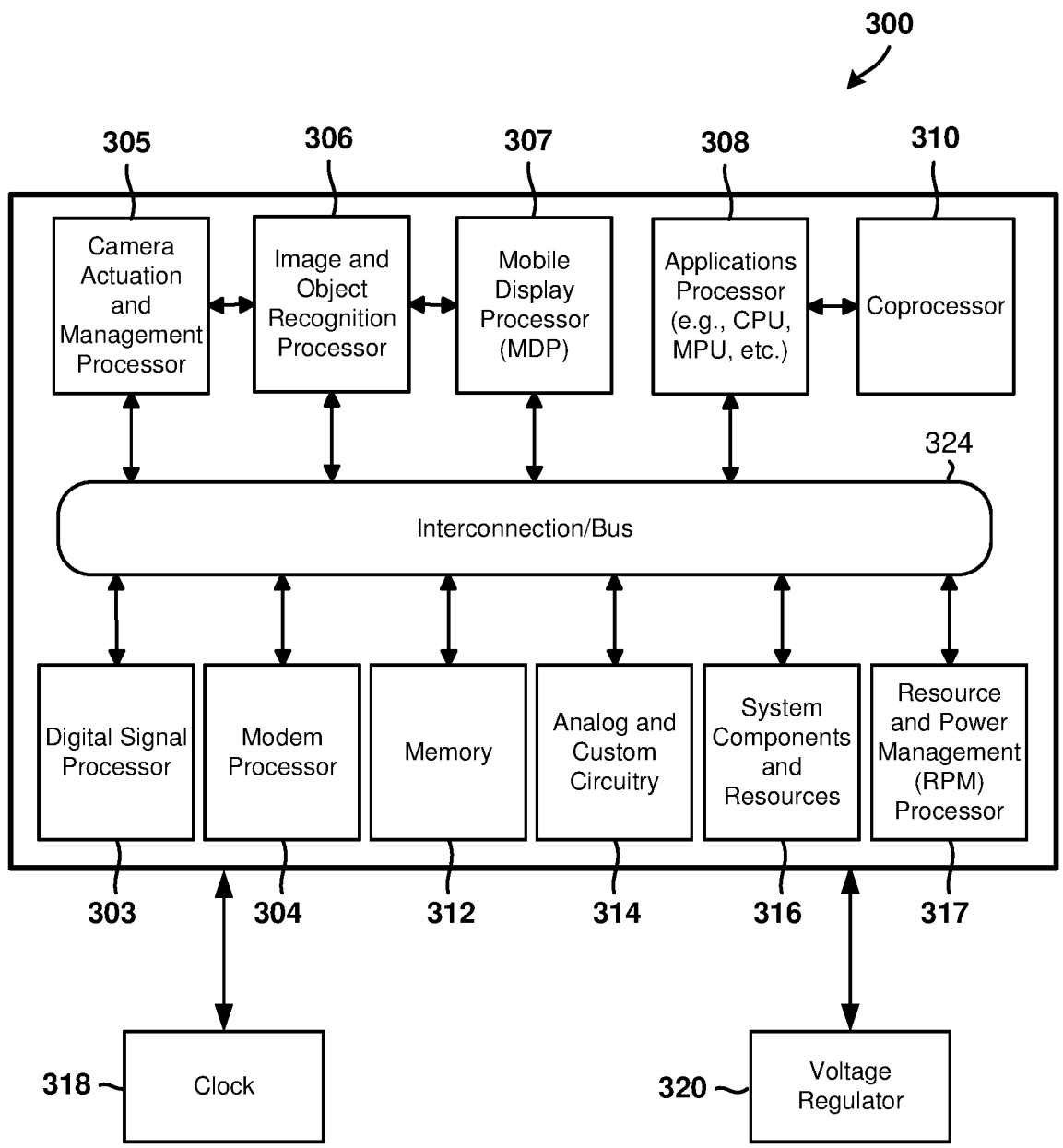
FIG. 3 is a block diagram illustrating components of a system on chip for use in a vehicle in accordance with various embodiments.

FIG. 3 illustrates an example system-on-chip (SOC) architecture of a processing device SOC 300 suitable for implementing various embodiments in vehicles. With reference to FIGS. 1A-3, the processing device SOC 300 may include a number of heterogeneous processors, such as a digital signal processor (DSP) 303, a modem processor 304, an image and object recognition processor 306, a mobile display processor 307, an applications processor 308, and a resource and power management (RPM) processor 317. The processing device SOC 300 may also include one or more coprocessors 310 (e.g., vector co-processor) connected to one or more of the heterogeneous processors 303, 304, 306, 307, 308, 317. Each of the processors may include one or more cores, and an independent/internal clock. Each processor/core may perform operations independent of the other processors/cores. For example, the processing device SOC 300 may include a processor that executes a first type of operating system (e.g., FreeBSD, LINUX, OS X, etc.) and a processor that executes a second type of operating system (e.g., Microsoft Windows). In some embodiments, the applications processor 308 may be the SOC's 300 main processor, central processing unit (CPU), microprocessor unit (MPU), arithmetic logic unit (ALU), etc. The graphics processor 306 may be graphics processing unit (GPU).

The processing device SOC 300 may include analog circuitry and custom circuitry 314 for managing sensor data, analog-to-digital conversions, wireless data transmissions, and for performing other specialized operations, such as processing encoded audio and video signals for rendering in a web browser. The processing device SOC 300 may further include system components and resources 316, such as voltage regulators, oscillators, phase-locked loops, peripheral bridges, data controllers, memory controllers, system controllers, access ports, timers, and other similar components used to support the processors and software clients (e.g., a web browser) running on a computing device.

The processing device SOC 300 also include specialized circuitry for camera actuation and management processor 305 that includes, provides, controls and/or manages the operations of one or more cameras 158, 160 (e.g., a primary camera, webcam, 3D camera, etc.), the video display data from camera firmware, image processing, video preprocessing, video front-end (VFE), in-line JPEG, high definition video codec, etc. The camera actuation and management processor 305 may be an independent processing unit and/or include an independent or internal clock.

In some embodiments, the image and object recognition processor 306 may be configured with processor-executable instructions and/or specialized hardware configured to perform image processing and object recognition analyses involved in various embodiments. For example, the image and object recognition processor 306 may be configured to perform the operations of processing images received from cameras (e.g., 158, 160) via the camera actuation and management processor 305 to recognize and/or identify other vehicles, and otherwise perform functions of the camera perception layer 204 as described. In some embodiments, the processor 306 may be configured to process radar or lidar data and perform functions of the radar perception layer 202 as described.

The system components and resources 316, analog and custom circuitry 314, and/or camera actuation and management processor 305 may include circuitry to interface with peripheral devices, such as cameras 158, 160, radar 168, lidar 170, electronic displays, wireless communication devices, external memory chips, etc. The processors 303, 304, 306, 307, 308 may be interconnected to one or more memory elements 312, system components and resources 316, analog and custom circuitry 314, camera actuation and management processor 305, and RPM processor 317 via an interconnection/bus module 324, which may include an array of reconfigurable logic gates and/or implement a bus architecture (e.g., CoreConnect, AMBA, etc.). Communications may be provided by advanced interconnects, such as high-performance networks-on chip (NoCs).

The processing device SOC 300 may further include an input/output module (not illustrated) for communicating with resources external to the SOC, such as a clock 318 and a voltage regulator 320. Resources external to the SOC (e.g., clock 318, voltage regulator 320) may be shared by two or more of the internal SOC processors/cores (e.g., a DSP 303, a modem processor 304, a graphics processor 306, an applications processor 308, etc.).

In some embodiments, the processing device SOC 300 may be included in a control unit (e.g., 140) for use in a vehicle (e.g., 100). The control unit may include communication links for communication with a telephone network (e.g., 180), the Internet, and/or a network server (e.g., 184) as described.

The processing device SOC 300 may also include additional hardware and/or software components that are suitable for collecting sensor data from sensors, including motion sensors (e.g., accelerometers and gyroscopes of an IMU), user interface elements (e.g., input buttons, touch screen display, etc.), microphone arrays, sensors for monitoring physical conditions (e.g., location, direction, motion, orientation, vibration, pressure, etc.), cameras, compasses, GPS receivers, communications circuitry (e.g., Bluetooth®, WLAN, WiFi, etc.), and other well-known components of modern electronic devices.

Figure 4:
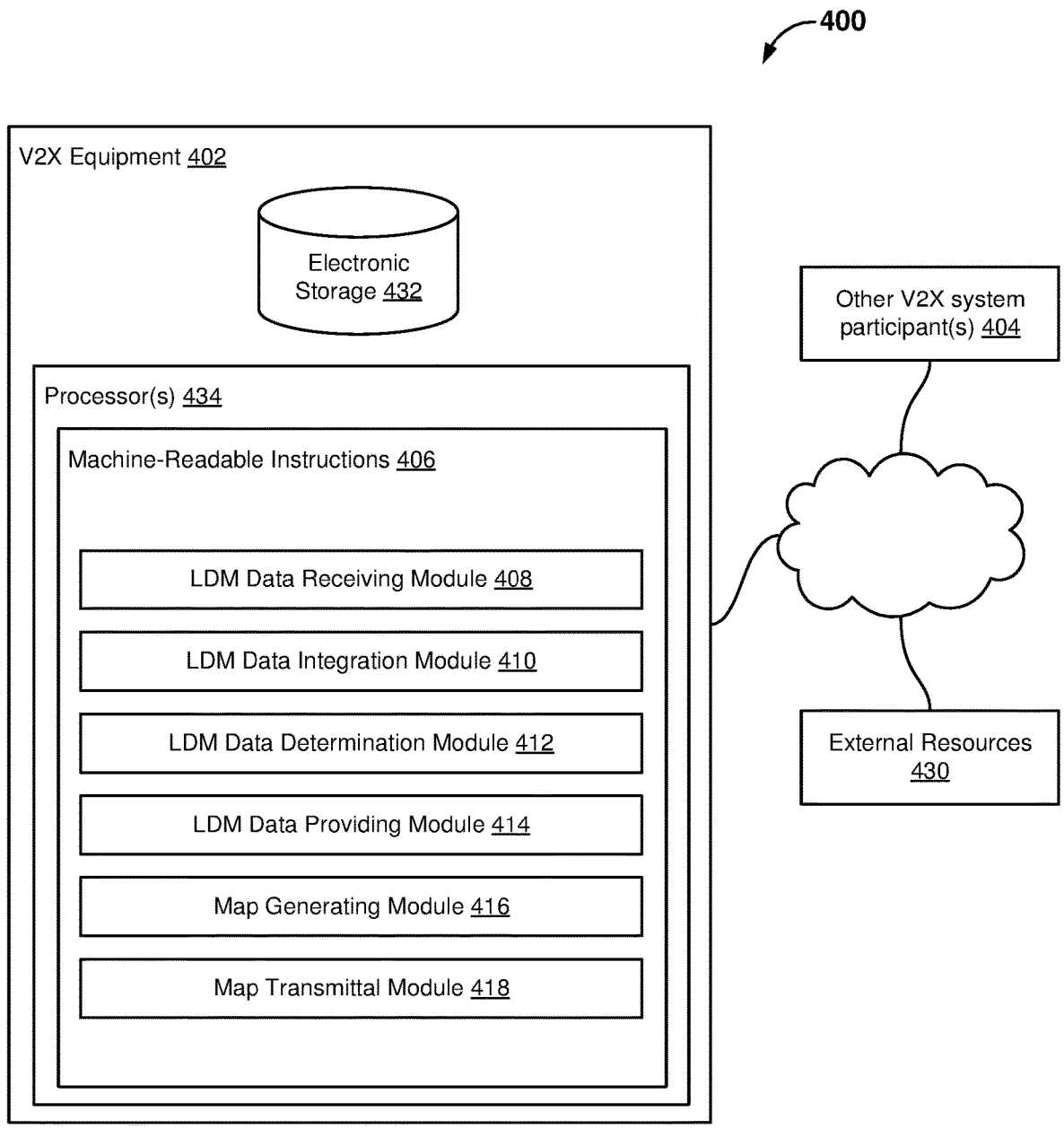
FIG. 4 is a component block diagram illustrating a system configured to generate local dynamic map data in accordance with various embodiments.

FIG. 4 is a component block diagram illustrating a system 400 configured to generate local dynamic map data model in accordance with various embodiments. In some embodiments, the system 400 may include one or more computing platforms 402 of V2X equipment and/or one or more other V2X system participants 404. With reference to FIGS. 1A-4 and 7-9, the V2X equipment 402 may include a processor (e.g., 434, 702, 802). The V2X equipment 402 may be configured by machine-executable instructions 406. Machine-executable instructions 406 may include one or more instruction modules. The instruction modules may include computer program modules. The instruction modules may include one or more of an LDM data receiving module 408, an LDM data integration module 410, an LDM data determination module 412, an LDM data providing module 414, a map generating module 416, a map transmittal module 418, and/or other instruction modules.

The LDM data receiving module 408 may be configured to receive fresh LDM data for the misbehavior management system operating on the V2X equipment processor. In some embodiments, the LDM data receiving module 408 may be configured to receive a registration message from other V2X system participants 404. In some embodiments, the LDM data receiving module 408 may be configured to receive planned route information from other V2X system participants 404. In some embodiments, the LDM data receiving module 408 may be configured to receive mobile device kinematics information from other V2X system participants 404. In some embodiments, the LDM data receiving module 408 may be configured to receive data from other V2X system participants 404, such as, for example, sensor data, image data, audio data, or operating state data obtained by the other V2X system participants 404.

The LDM data integration module 410 may be configured to integrate the fresh LDM data into an LDM data model.

The LDM data determination module 412 may be configured to determine LDM data of the LDM data model that is relevant to other particular V2X system participants 404. In some embodiments, the LDM data determination module 412 may be configured to determine LDM data that is relevant to another particular V2X system participant 404 based on information included with the registration message. In some embodiments, the LDM data determination module 412 may be configured to determine LDM data that is relevant to another particular V2X system participant based on the planned route information. In some embodiments, the LDM data determination module 412 may be configured to determine LDM data that is relevant to another particular V2X system participant 404 based on kinematics information. In some embodiments, the LDM data determination module 412 may be configured to determine from the received data information that is relevant to the LDM data.

The LDM data providing module 414 may be configured to provide the determined relevant LDM data to other V2X system participants 404. In some embodiments, the determined relevant LDM data may include highly dynamic LDM information.

The map generating module 416 may be configured to generate a digital map encompassing an area within a predetermined distance of other V2X system participants. In some embodiments, the map transmittal module 418 may be configured to transmit the digital map to other V2X system participants 404. The digital map may be generated and transmitted in a format suitable for use in autonomous navigation of other V2X system participants 404.

In some implementations, the V2X equipment 402, other V2X system participants devices 404, and/or external resources 430 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which V2X equipment 402, other V2X system participants 404, and/or external resources 430 may be operatively linked via some other communication media.

Each of the other V2X system participants 404 may include one or more processors configured to execute computer program modules. The computer program modules may be configured to enable an expert or user associated with a given V2X system participant 404 to interface with system 400 and/or external resources 430, and/or provide other functionality attributed herein to other V2X system participants 404.

The external resources 430 may include sources of information outside of V2X system 400, external entities participating with V2X system 400, and/or other resources. In some implementations, some or all of the functionality attributed herein to external resources 430 may be provided by resources included in system 400.

The V2X equipment 402 may include an electronic storage 432, one or more processors 434, and/or other components. The V2X equipment 402 may include communication lines, or ports to enable the exchange of information with a network and/or other computing platforms. The illustration of an V2X equipment 402 in FIG. 4 is not intended to be limiting. The V2X equipment 402 may include a plurality of hardware, software, and/or firmware components operating together to provide the functionality attributed herein to V2X equipment 402. For example, the V2X equipment 402 may be implemented by a cloud of computing platforms operating together V2X equipment 402.

The electronic storage 432 may comprise non-transitory storage media that electronically stores information. The electronic storage media of the electronic storage 432 may include one or both of system storage that is provided integrally (i.e., substantially non-removable) with V2X equipment 402 and/or removable storage that is removably connectable to V2X equipment 402 via, for example, a port (e.g., a universal serial bus (USB) port, a firewire port, etc.) or a drive (e.g., a disk drive, etc.). The electronic storage 432 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 432 may include one or more virtual storage resources (e.g., cloud storage, a virtual private network, and/or other virtual storage resources). The electronic storage 432 may store software algorithms, information determined by processor(s) 434, information received from V2X equipment 402, information received from other V2X system participant(s) 404, and/or other information that enables V2X equipment 402 to function as described herein.

Processor(s) 434 may be configured to provide information processing capabilities in V2X equipment 402. As such, processor(s) 434 may include one or more of a digital processor, an analog processor, a digital circuit designed to process information, an analog circuit designed to process information, a state machine, and/or other mechanisms for electronically processing information. Although processor(s) 434 is shown in FIG. 4 as a single entity, this is for illustrative purposes only. In some implementations, processor(s) 434 may include a plurality of processing units. These processing units may be physically located within the same device, or processor(s) 434 may represent processing functionality of a plurality of devices operating in coordination. Processor(s) 434 may be configured to execute modules 408, 410, 412, 414, 416, 418, and/or other modules. Processor(s) 434 may be configured to execute modules 408, 410, 412, 414, 416, 418, and/or other modules by software; hardware; firmware; some combination of software, hardware, and/or firmware; and/or other mechanisms for configuring processing capabilities on the processor(s) 434. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 408-418 are illustrated in FIG. 4 as being implemented within a single processing unit, in implementations in which the processor(s) 434 includes multiple processing units, one or more of the modules 408-418, may be implemented remotely from the other modules. The description of the functionality provided by the different modules 408-418 described below is for illustrative purposes, and is not intended to be limiting, as any of the modules 408-418 may provide more or less functionality than is described. For example, one or more of modules 408-418 may be eliminated, and some or all of its functionality may be provided by other ones of the modules 408-418. As another example, processor(s) 434 may be configured to execute one or more additional modules that may perform some or all of the functionality attributed below to one of the modules 408-418.

Figure 5:
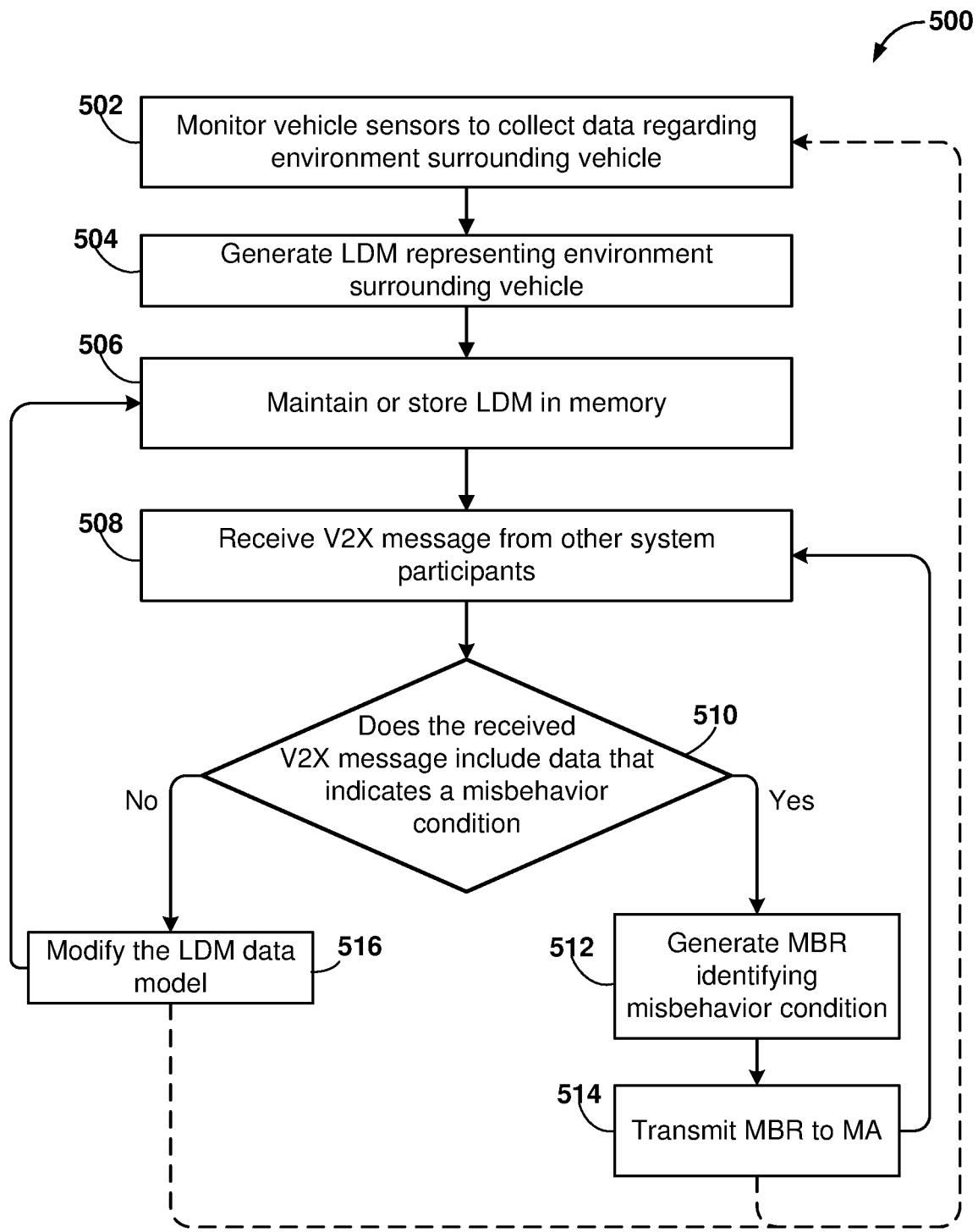
FIG. 5 is a process flow diagram illustrating operations of a method performed by a processor of V2X equipment for detecting a misbehavior condition in a V2X message by comparing the data in the received V2X message with data in an LDM data model in accordance with various embodiments.

FIG. 5 is a process flow diagram illustrating operations of a method 500 performed by a processor of an observing vehicle's V2X equipment for detecting a misbehavior condition by comparing received V2X message to a vehicle's local dynamic map (LDM) data model and determining whether inconsistencies exist between the data received in the V2X message and the locally maintained or stored LDM data model. With reference to FIGS. 1-5, the operations of the method 500 may be performed by a processor of an observing vehicle V2X equipment (e.g., vehicle 12 in FIG. 1D).

In block 502, the processor may monitor a plurality of the vehicle's sensors that relate to the control maneuvering, navigation, and/or other operations of the observing vehicle (e.g., vehicle 12). By monitoring data from the vehicle's own sensors, the misbehavior management system operating on the observing vehicle's V2X equipment 402 may begin to collect the data that may be used to generate the LDM data model that represents the environment surrounding the observing vehicle. This may include information regarding a suspect vehicle that sends a V2X message with data that indicates a misbehavior condition. In addition, the LDM data model may include information regarding neighboring vehicles.

In block 504, an LDM data model that represents the environment surrounding the observing vehicle may be generated by the V2X equipment 402 based at least in part on an aggregation of the additional data collected from the plurality of sensors as discussed above with respect to FIGS. 2A-4. The LDM data model may contain Type 1-4 data. In block 506, the generated LDM data model may be locally maintained or stored in memory (e.g., electronic storage 432).

In block 508, the misbehavior management system operating on the V2X equipment processor may receive a V2X message from another V2X system participant 404. The V2X message may contain traffic information, GPS information of the reporting vehicle and other neighboring vehicles calculated from the on-board equipment of the reporting vehicle and/or provided by neighboring vehicle themselves, and/or map data that specifies road geometry and street features.

In determination block 510, the V2X message, the misbehavior management system operating on the V2X equipment processor may determine whether the received V2X message includes data that indicates a misbehavior condition by comparing data contained in the received V2X message to the locally maintained or stored LDM data model to detect misbehavior conditions. For example, the instant vehicle (referred to as the observing vehicle) may receive a V2X message that includes data indicating that another vehicle (referred to as the reporting vehicle) may be passing between two neighboring vehicles. In some embodiments, the reporting vehicle and the two neighboring vehicles may all be V2X system participants. However, in some situations, none of the reporting vehicle and the two neighboring vehicles are V2X system participants. In other situations, some of the reporting vehicle and two neighboring vehicles may be V2X system participants while others are not.

In the example, the observing vehicle may obtain information about the location/position, traveling direction, speed, operation, etc. of the reporting vehicle as well as of two neighboring vehicles through the observing vehicle's own sensors. For example, cameras and LIDAR that is installed on-board the observing vehicles. In addition, the observing vehicle may receive a V2X message from any and/or all of the reporting vehicle and two neighboring vehicles. Such received V2X messages may contain camera and/or LIDAR information that confirms the observing vehicle's observations regarding location/position, traveling direction, speed, operation, etc. of the reporting vehicle as well as of two neighboring vehicles. In addition, V2X messages from any of the reporting vehicle or two neighboring vehicles may include GPS location/position information, speedometer data, etc. Still further camera and LIDAR information on any of the reporting vehicle or two neighboring vehicles may be received from a RSU V2X system participant.

Any and all of this data that is received in the variety of V2X messages may augment the locally maintained LDM data model that the observing vehicle has created to represent the environment surrounding the observing vehicle. Thus, the LDM data model of the observing vehicle may include data regarding the location/position, traveling direction, and speed of the reporting vehicle and two neighboring vehicles. The observing vehicle may detect a misbehavior condition by comparing the data contained in a received V2X message to the data within the observing vehicle's LDM data model. For example, the V2X message that is received from the reporting vehicle may indicate that the reporting vehicle is passing between the two neighboring vehicles. However, based on all of the other information that has been collected by the observing vehicle, the LDM data model of observing vehicle may indicate that there is insufficient space for the reporting vehicle to pass through the two neighboring vehicles. Thus, the misbehavior management system operating on the observing vehicle's V2X equipment processor may identify the V2X message that is received from the reporting vehicle as containing or evidencing a misbehavior condition. Any of the data indicating location/position, speed, traveling direction etc. that is received from the reporting vehicle in the V2X message may be inaccurate, corrupt or maliciously altered.

In response to determining that the V2X message that is received from the reporting vehicle includes data that indicates a misbehavior condition based on the comparison in block 510 (i.e., determination 510=Yes), the misbehavior management system operating in the observing vehicle's V2X equipment 402 may generate a misbehavior report (MBR) that identifies the misbehavior condition and the suspect vehicle that sent the V2X message in block 512.

In block 514, the misbehavior management system operating in the observing vehicle's V2X equipment 402 may transmit the MBR to a misbehavior managing authority (MA) for further analysis, reporting and corrective measures. For example, the MA may send a message to the suspect vehicle that service or replacement of its sensors is required. In order to perform an accurate and comprehensive analysis of the misbehavior condition, the MA may utilize the data within the LDM data model so that a holistic analysis of the situation giving rise to the misbehavior condition may be determined. In addition, by analyzing the data within the LDM data model, more appropriate and efficient corrective measures may be issued to mitigate the misbehavior condition. To enable this, some embodiments include the misbehavior management system providing a better quality misbehavior detection (such as providing fewer false negative detections), improving the robustness and resilience of the V2X system 103.

However, as more and more vehicles are equipped with V2X equipment, the volume of possible detected misbehaviors is growing at an exponential rate. In addition, amount of data that may be included with a MBR may be prohibitively large given limits on bandwidth due to the large number of MBRs to transmit. To address this and reduce the amount of data that may be transmitted with the MBR, in some embodiments the misbehavior management system may transmit only a representation of the LDM data model to the MA. In some embodiments, the misbehavior management system may transmit an incomplete data set for the LDM data model when transmitting the MBR to the MA, such as including only data most relevance to the detected misbehavior condition and/or excluding data irrelevant to the misbehavior condition.

After transmitting the MBR to the MA in block 514, the misbehavior management system operating in the observing vehicle's V2X equipment 402 may again perform the operations in block 502 to continue monitoring the observing vehicle's sensors to collect data regarding the environment surrounding the observing vehicle.

In response to determining that the data included in the received V2X message does not indicate a misbehavior condition (i.e., determination 510=No), the misbehavior management system may perform calculations based on at least one of observed dynamics of objects in the LDM data model or on new data input received from the V2X message and then modify the LDM data model to incorporate the calculations and data based on and included in the received V2X message to augment, improve or otherwise update the observing vehicle's LDM data model in block 516 and then store the updated LDM data in block 506. Thus, the misbehavior management system operating in the observing vehicle's V2X equipment 402 may continuously refine the LDM data model. The updated LDM data model may include additional data from the V2X message that improves and/or refines the LDM data model representing the environment surrounding the observing vehicle. The updated LDM data model may be locally maintained or stored in memory in block 506.

Following transmission of the MBR to the MA in block 514 or storage of the updated LDM data model in block 506, the misbehavior management system operating in the observing vehicle's V2X equipment 402 may continue to receive other V2X messages in block 508 as described.

In some embodiments, misbehavior management system operating in the observing vehicle's V2X equipment 402 may also periodically perform the operations in block 502 to continue monitoring the observing vehicle's sensors to collect data regarding the environment surrounding the observing vehicle. In this manner, the universe of data that represents the environment surrounding the observing vehicle may be continually expanded to improve and update the LDM so that misbehavior conditions may be more accurately detected.

Figure 6:
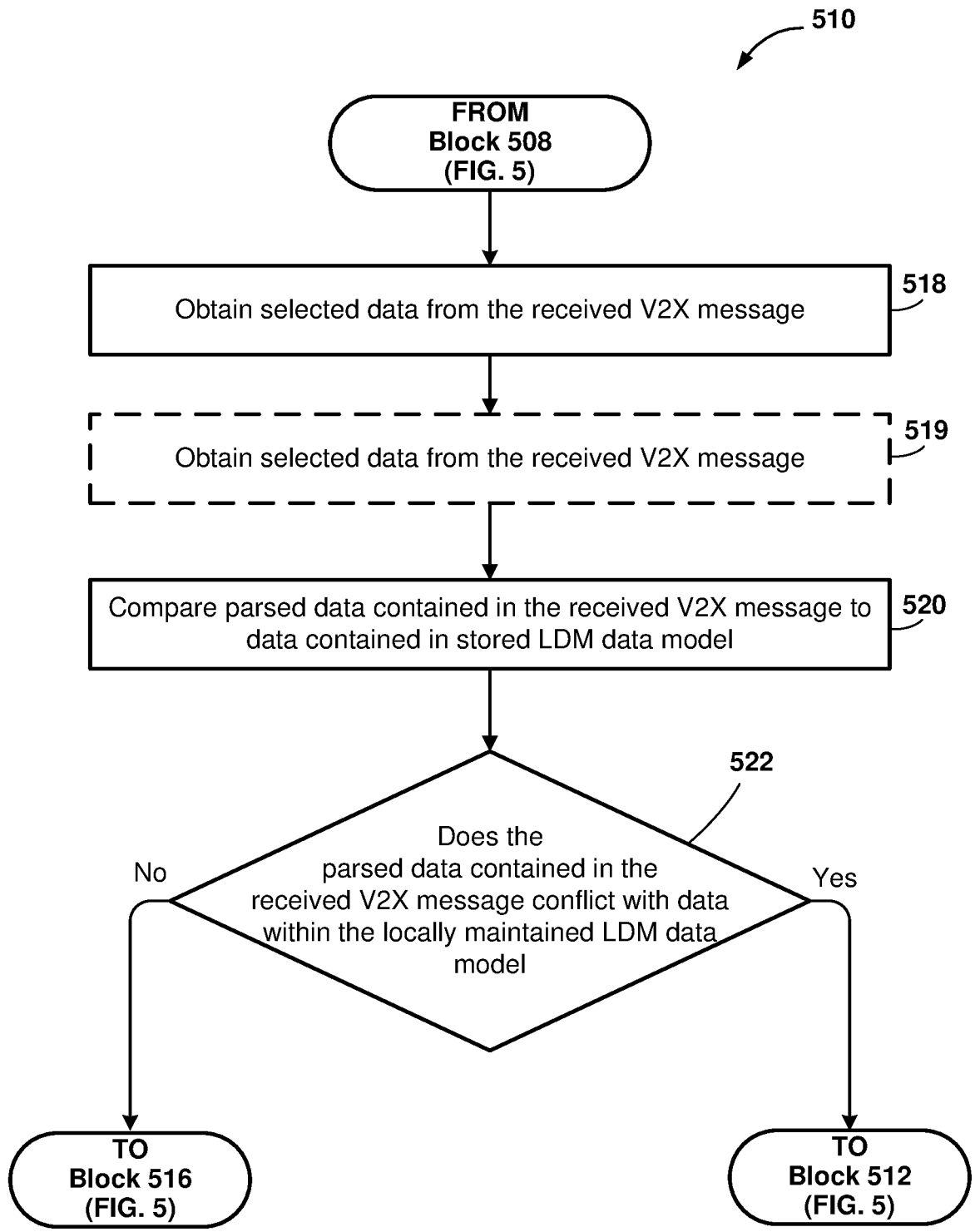
FIG. 6 is a process flow diagram illustrating operations of a method for comparing data in a received V2X message to data in an LDM data model in accordance with various embodiments.

FIG. 6 is a process flow diagram illustrating example operations that may be performed as part block 510 of the method 500 of determining whether a misbehavior condition is detected in the received V2X message. With reference to FIGS. 1A-6, operations of block 510 may be performed by the misbehavior management system operating in the observing vehicle's V2X equipment 402.

After receiving a V2X message in block 508 of the method 500, the misbehavior management system may obtain selected data (e.g., location/position, speed, travelling direction, temperature, etc.) from the received V2X message in block 518. As part of the operations in block 518, an identifier of the originating sender of the received V2X message may be obtained.

In optional block 519, the misbehavior management system may select data elements or data elements within the LDM data model for use in determining whether information reported in the V2X message indicates or is the product of misbehavior. As described, the LDM data model will include many data elements defining the environment surrounding the vehicle and other vehicles in the vicinity, many elements of which may be useful for assessing the accuracy or reliability of information received in a V2X message. Thus, in some embodiments, the misbehavior management system may select certain data elements (e.g., a subset of information) within the LDM data model to be used for verifying or validating the received V2X message. In some embodiments, the misbehavior management system may select information or elements within the LDM data model based on or in response to the type of information within the receive V2X message. For example, if the V2X message includes a location of another vehicle or of a roadway hazard ahead of the ego vehicle, the misbehavior management system may select location-related data elements within the LDM data model to use in validating or the V2X message, and avoid accessing data elements related velocity, weather conditions, roadway conditions, or locations behind the ego vehicle. As another example, if the V2X message includes dynamic information about another vehicle (e.g., turning angle, speed, braking status, etc.), data elements within the LDM data model that are static or old will be of no use in evaluating the V2X message. By selecting and accessing a subset of information within the LDM data model that is relevant to validating or verifying information in the received V2X message, the misbehavior management system may save processing resources and memory utilization, and enable evaluating the message faster than if all data within the LDM data model are used in the message evaluation process.

In block 520, the misbehavior management system operating in the observing vehicle's V2X equipment may compare the parsed data contained in the received V2X message against the data within the LDM data model that is maintained or stored in memory (e.g., storage 432) of the observing vehicle.

In determination block 522, the misbehavior management system may determine whether any of the parsed data contained in the received V2X message conflicts or is inconsistent with the data within the LDM data model that is maintained or stored in memory (e.g., storage 432) of the observing vehicle.

For example, in determination block 522, the misbehavior management system may analyze location information of a vehicle issuing the received V2X message to determine whether the information reported in the V2X message is inconsistent or conflicts with location information in the LDM data model (e.g., indicating a location that corresponds to another vehicle's location in the LDM).

As another example of a possible misbehavior condition that may be detected using LDM data in determination block 522, the observing vehicle may be tracking a neighboring vehicle through the observing vehicle's sensors. The neighboring vehicle may not be a V2X system participant. A suspect vehicle may send the observing vehicle V2X messages that imply that the suspect vehicle is located in a position that overlaps the position of a tracked neighboring vehicle that is observed and determined by the observing vehicle's sensor. Put another way, the suspect vehicle may send the observing vehicle a V2X message that implies that the suspect vehicle location coincides with the position of the tracked neighboring vehicles that is observed and determined by the observing vehicle's sensor (e.g., camera). In such an instance, the V2X message that is received by the observing vehicle from the suspect vehicle contains data that conflicts or is inconsistent with the data in the observing vehicle's LDM data model. Thus, the observing vehicle may generate a MBR that indicates the misbehavior condition of the suspect vehicle.

In another example of a possible misbehavior condition that may be detected using LDM data in determination block 522, there may be an obstruction in the road. For example, sofa that was being transported may have fallen off a flatbed truck. The observing vehicle may detect the obstruction through the observing vehicle's sensors. The observing vehicle may receive a V2X message from a suspect vehicle that includes data that implies that the suspect vehicles maintained its traveling direction and speed such that the suspect vehicle drove through the obstruction without slowing down. In such an instance, the V2X message that is received by the observing vehicle from the suspect vehicle contains data that conflicts or is inconsistent with the data in the observing vehicle's LDM data model. Thus, the observing vehicle may generate a MBR that indicates the misbehavior condition of the suspect vehicle.

As another example of a possible misbehavior condition that may be detected using LDM data in determination block 522, the observing vehicle may be tracking a neighboring vehicle through the observing vehicle's sensors. The neighboring vehicle may not be a V2X system participant. The view of the neighboring vehicle may be temporarily obstructed from the observing (i.e. something gets in the way for a short time so the observing vehicle cannot directly see the AV) and then becomes trackable again. During the time of obstruction, a suspect vehicle may send a V2X messages to the observing vehicle about the suspect vehicle's traveling direction (i.e., track). The observing vehicle may reconstruct the routes that the neighboring vehicle may have taken while the neighboring vehicle was out of visibility. Based on this information, the observing vehicle may note that all the possible routes imply a collision between the suspect vehicle and the neighboring vehicle. Since no collision was recorded by the observing vehicle, the V2X message that is received by the observing vehicle from the suspect vehicle contains data that conflicts or is inconsistent with the data in the observing vehicle's LDM data model. Thus, the observing vehicle may generate a MBR that indicates the misbehavior condition of the suspect vehicle.

As another example of a possible misbehavior condition that may be detected using LDM data in determination block 522, the observing vehicle may receive a V2X traffic signal message from a RSU indicating that the traffic light is red. The observing vehicle may receive a V2X message from a suspect vehicle indicating that the suspect vehicle is containing to move through the intersection. While the suspect vehicle may be actually running a red light, the V2X message that is received by the observing vehicle from the suspect vehicle seemingly contains data that conflicts or is inconsistent with the data in the observing vehicle's LDM data model. Thus, the observing vehicle may generate a MBR that indicates the misbehavior condition of the suspect vehicle.

As another example of a possible misbehavior condition that may be detected using LDM data in determination block 522, the observing vehicle may receive a V2X message from a RSU indicating that road construction is causing a lane shift. The lane shift is not shown in a static map available to the observing vehicle. However, based on incoming V2X messages, the observing vehicle notes that all neighboring vehicles behave as if a lane shift is in place, i.e. they all shift one lane's width to the left at a particular location. A suspect vehicle may send a V2X message implying that the suspect vehicle does not observe the lane shift, i.e. it appears to drive straight through even though other neighboring vehicles performing the lane shift should be visible to the driver. The implication is that the suspect vehicle is having its messages generated remotely to the actual location by an attacker who doesn't know about the lane shift. In such an instance, the V2X message that is received by the observing vehicle from the suspect vehicle contains data that conflicts or is inconsistent with the data in the observing vehicle's LDM data model. Thus, the observing vehicle may generate a MBR that indicates the misbehavior condition of the suspect vehicle.

In response to determining that the parsed data contained in the received V2X message conflicts or is inconsistent with the data within the LDM data model that is maintained or stored in memory (e.g., storage 432) of the observing vehicle (i.e., determination 522=Yes), the misbehavior management system operating in the observing vehicle's V2X equipment 402 may perform the operations in block 512 of the method 500 to generate an MBR as described.

In response to determining that the parsed data contained in the received V2X message does not conflict or is consistent with the data within the LDM data model that is maintained or stored in memory (e.g., storage 432) of the observing vehicle (i.e., determination 522=No), the misbehavior management system operating in the observing vehicle's V2X equipment 402 may perform the operations in block 516 to modify or update the LDM data model as described.

Figure 7:
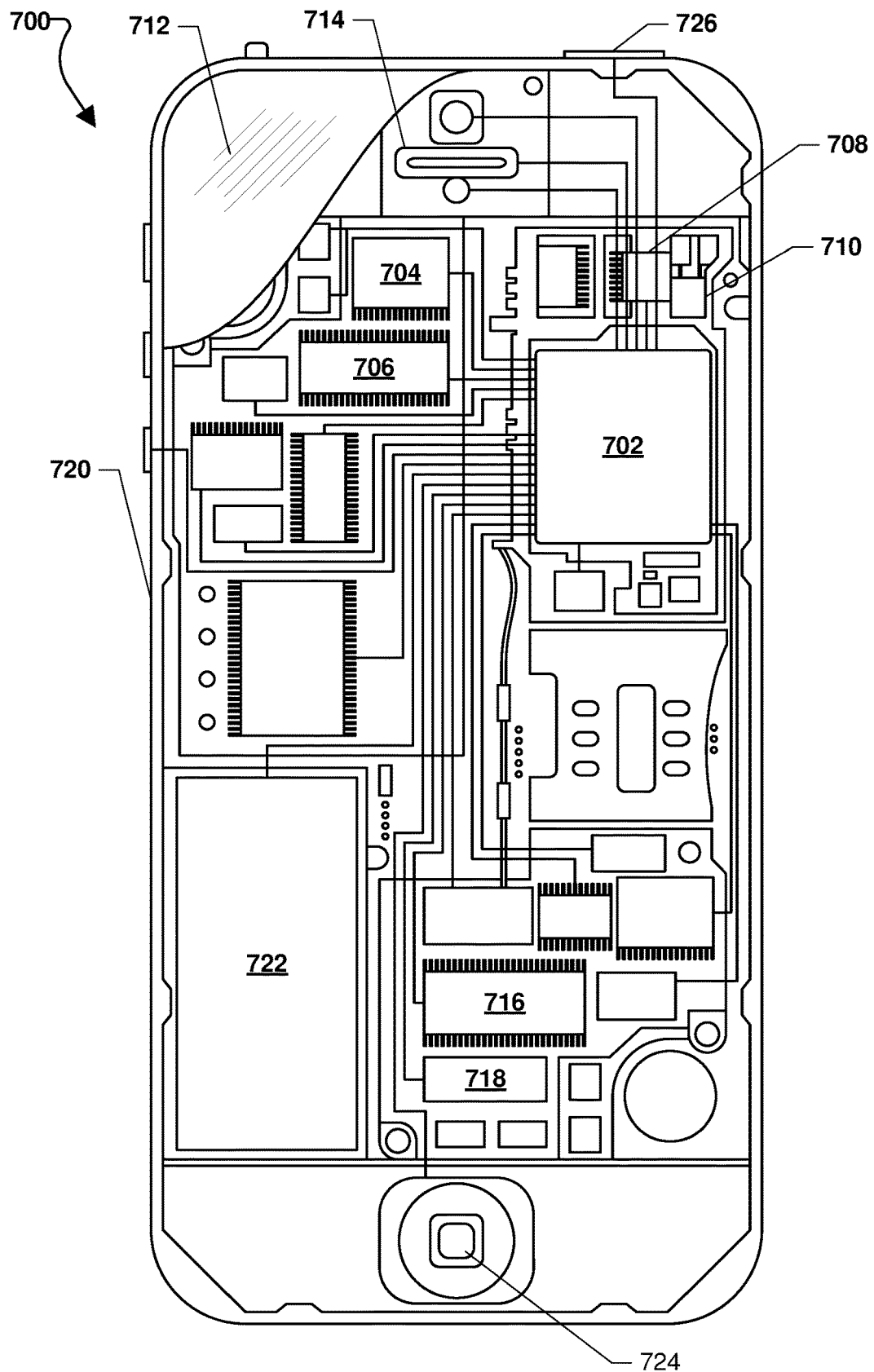
FIG. 7 is a component block diagram illustrating an example mobile computing device suitable for use with the various embodiments.

Various embodiments (including, but not limited to, embodiments described above with reference to FIGS. 1A-6) may be implemented in a wide variety of computing systems including on-board equipment as well as mobile computing devices, an example of which suitable for use with the various embodiments is illustrated in FIG. 7. The mobile computing device 700 may include a processor 702 coupled to a touchscreen controller 704 and an internal memory 706. The processor 702 may be one or more multicore integrated circuits designated for general or specific processing tasks. The internal memory 706 may be volatile or non-volatile memory, and may also be secure and/or encrypted memory, or unsecure and/or unencrypted memory, or any combination thereof. Examples of memory types that can be leveraged include but are not limited to DDR, LPDDR, GDDR, WIDEIO, RAM, SRAM, DRAM, P-RAM, R-RAM, M-RAM, STT-RAM, and embedded DRAM. The touchscreen controller 704 and the processor 702 may also be coupled to a touchscreen panel 712, such as a resistive-sensing touchscreen, capacitive-sensing touchscreen, infrared sensing touchscreen, etc. Additionally, the display of the mobile computing device 700 need not have touch screen capability.

The mobile computing device 700 may have one or more radio signal transceivers 708 (e.g., Peanut, Bluetooth, ZigBee, Wi-Fi, RF radio) and antennae 710, for sending and receiving communications, coupled to each other and/or to the processor 702. The transceivers 708 and antennae 710 may be used with the above-mentioned circuitry to implement the various wireless transmission protocol stacks and interfaces. The mobile computing device 700 may include a cellular network wireless modem chip 716 that enables communication via a cellular network and is coupled to the processor.

The mobile computing device 700 may include a peripheral device connection interface 718 coupled to the processor 702. The peripheral device connection interface 718 may be singularly configured to accept one type of connection, or may be configured to accept various types of physical and communication connections, common or proprietary, such as Universal Serial Bus (USB), FireWire, Thunderbolt, or PCIe. The peripheral device connection interface 718 may also be coupled to a similarly configured peripheral device connection port (not shown).

The mobile computing device 700 may also include speakers 714 for providing audio outputs. The mobile computing device 700 may also include a housing 720, constructed of a plastic, metal, or a combination of materials, for containing all or some of the components described herein. One of ordinary skill in the art may recognize that the housing 720 may be a dashboard console of a vehicle in an on-board embodiment. The mobile computing device 700 may include a power source 722 coupled to the processor 702, such as a disposable or rechargeable battery. The rechargeable battery may also be coupled to the peripheral device connection port to receive a charging current from a source external to the mobile computing device 700. The mobile computing device 700 may also include a physical button 724 for receiving user inputs. The mobile computing device 700 may also include a power button 726 for turning the mobile computing device 700 on and off.

Figure 8:
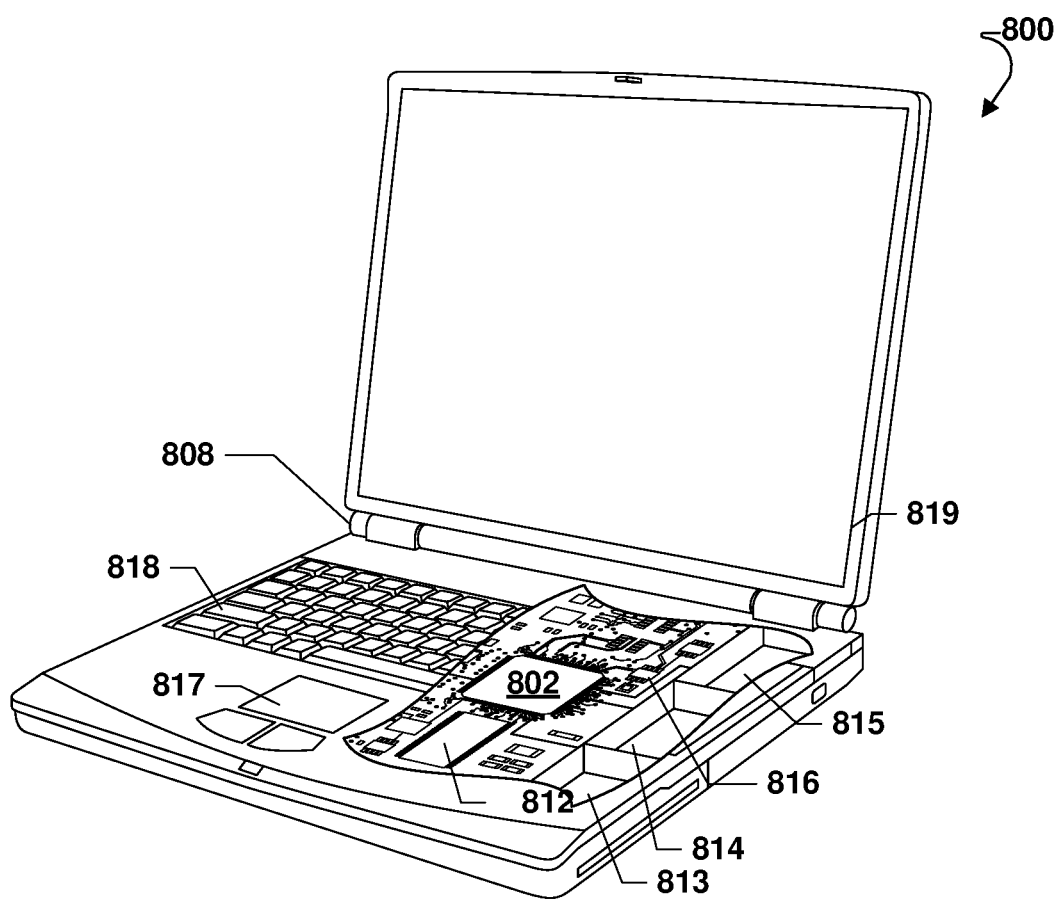
FIG. 8 is a component block diagram illustrating an example mobile computing device suitable for use with the various embodiments.

Various embodiments (including, but not limited to, embodiments described above with reference to FIGS. 1A-6) may be implemented in a wide variety of computing systems include a laptop computer 800 an example of which is illustrated in FIG. 8. Many laptop computers include a touchpad touch surface 817 that serves as the computer's pointing device, and thus may receive drag, scroll, and flick gestures similar to those implemented on computing devices equipped with a touch screen display and described above. A laptop computer 800 will typically include a processor 802 coupled to volatile memory 812 and a large capacity nonvolatile memory, such as a disk drive 813 of Flash memory. Additionally, the computer 800 may have one or more antenna 808 for sending and receiving electromagnetic radiation that may be connected to a wireless data link and/or cellular telephone transceiver 816 coupled to the processor 802. The computer 800 may also include a floppy disc drive 814 and a compact disc (CD) drive 815 coupled to the processor 802. In a notebook configuration, the computer housing includes the touchpad 817, the keyboard 818, and the display 819 all coupled to the processor 802. Other configurations of the computing device may include a computer mouse or trackball coupled to the processor (e.g., via a USB input) as are well known, which may also be used in conjunction with the various embodiments.

Figure 9:
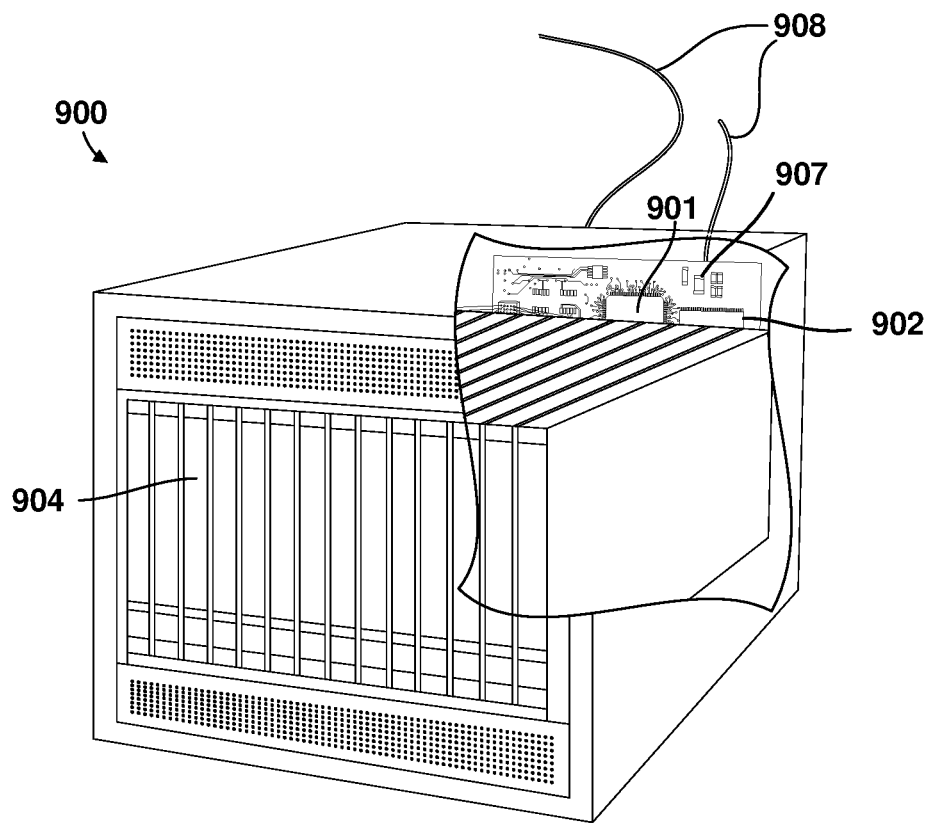
FIG. 9 is a component block diagram illustrating an example server suitable for use with the various embodiments.

The various embodiments (including, but not limited to, embodiments described above with reference to FIGS. 1A-6) may also include a Misbehavior Managing Authority that utilizes fixed computing systems, such as any of a variety of commercially available servers. An example server 900 is illustrated in FIG. 9. Such a server 900 typically includes one or more multicore processor assemblies 901 coupled to volatile memory 902 and a large capacity nonvolatile memory, such as a disk drive 904. As illustrated in FIG. 9, multicore processor assemblies 901 may be added to the server 900 by inserting them into the racks of the assembly. The server 900 may also include network access ports 907 coupled to the multicore processor assemblies 901 for establishing network interface connections with a network 908, such as a local area network coupled to other broadcast system computers and servers, the Internet, the public switched telephone network, and/or a cellular data network (e.g., CDMA, TDMA, GSM, PCS, 3G, 4G, 5G, LTE, or any other type of cellular data network).

A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), 3GSM, general packet radio service (GPRS), code division multiple access (CDMA) systems (e.g., cdmaOne, CDMA1020™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

Implementation examples are described in the following paragraphs. While some of the following implementation examples are described in terms of example methods, further example implementations may include: the example methods discussed in the following paragraphs implemented by a misbehavior management system operating on a V2X equipment processor that may be an on-board unit, mobile device unit, mobile computing unit, or stationary roadside unit including a processor configured with processor-executable instructions to perform operations of the methods of the following implementation examples; the example methods discussed in the following paragraphs implemented by a V2X equipment including means for performing functions of the methods of the following implementation examples; and the example methods discussed in the following paragraphs may be implemented as a non-transitory processor-readable storage medium having stored thereon processor-executable instructions configured to cause a processor of a V2X equipment to perform the operations of the methods of the following implementation examples.

Example 1. A method of detecting misbehavior conditions in a vehicle-to-everything (V2X) system performed by a processor of a vehicle, including: receiving a V2X message from another V2X system participant, in which the V2X message contains data regarding the environment surrounding the vehicle; comparing data contained in the received V2X message to a locally maintained or stored local dynamic map (LDM) data model to detect misbehavior conditions; generating a misbehavior report identifying a misbehavior condition in response to detecting the misbehavior condition based on the comparison; and transmitting the generated misbehavior report to a misbehavior managing authority.

Example 2. The method of example 1, further including: monitoring a plurality of sensors in the vehicle to collect additional data regarding an environment surrounding the vehicle; generating the LDM data model representing the environment surrounding the vehicle based at least in part on an aggregation of the additional data collected from the plurality of sensors; and storing the LDM data model in memory.

Example 3. The method of either examples 1 or 2, further including: in response to determining that a misbehavior condition is not detected: performing calculations based on at least one of observed dynamics of objects in the LDM data model or on new data input received from the V2X message; modifying the LDM data model to incorporate the calculations and data included in the received V2X message; and replacing the LDM data model locally maintained or stored in memory with the modified LDM model.

Example 4. The method of any of examples 1-3, in which transmitting the generated misbehavior report to a misbehavior managing authority includes transmitting a representation of the LDM data model.

Example 5. The method of example 4, in which the representation of the LDM data model includes an incomplete data set for the LDM data model.

Example 6. The method of any of examples 1-5, further including receiving feedback from the misbehavior managing authority, in which the feedback includes corrective measures to mitigate the misbehavior condition.

Example 7. The method of any of examples 1-6, in which the data regarding the environment surrounding the vehicle included in the received V2X message includes traffic information.

Example 8. The method of any of examples 1-7, in which the data regarding the environment surrounding the vehicle included in the received V2X message includes location information of neighboring vehicles based on GNSS (e.g., GPS) data.

Example 9. The method of any of examples 1-8, in which the data regarding the environment surrounding the vehicle included in the received V2X message includes map data that specifies road geometry and street furniture.

Example 10. The method of any of examples 1-9, in which comparing data included in the received V2X message to the locally maintained or stored LDM data model to detect misbehavior conditions includes determining whether any data included in the received V2X message conflicts with information in the locally maintained or stored LDM data model.

Example 11. The method of any of examples 1-10, in which comparing data included in the received V2X message to the locally maintained or stored LDM data model to detect misbehavior conditions includes selecting a subset of data elements within the locally maintained or stored LDM data model for comparison to data included in the received V2X message; and determining whether any data included in the received V2X message conflicts with the selected subset of data elements within the locally maintained or stored LDM data model.

Example 12. The method of any of examples 1-11, in which comparing data included in the received V2X message to the locally maintained or stored LDM data model to detect misbehavior conditions includes determining whether a location of a first neighboring vehicle included in the received V2X message coincides with a location of a second neighboring vehicle in the locally maintained or stored LDM data model.

Example 13. The method of any of examples 1-12, in which comparing data included in the received V2X message to the locally maintained or stored LDM data model to detect misbehavior conditions includes determining whether status information of a neighboring vehicle that transmitted the received V2X message conflicts with status information of the neighboring vehicle in the locally maintained or stored LDM data model.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method of detecting misbehavior conditions in a vehicle-to-everything (V2X) system performed by a processor of a vehicle, comprising:
receiving a V2X message from another V2X system participant, wherein the V2X message contains data regarding an environment surrounding the vehicle;
comparing data contained in the received V2X message to a locally maintained or stored local dynamic map (LDM) data model to detect misbehavior conditions;

generating a misbehavior report identifying a misbehavior condition in response to detecting the misbehavior condition based on the comparison;

transmitting the generated misbehavior report to a misbehavior managing authority; and receiving feedback from the misbehavior managing authority, wherein the feedback includes corrective measures to mitigate the misbehavior condition.

2. The method of claim 1, further comprising:

monitoring a plurality of sensors in the vehicle to collect additional data regarding an environment surrounding the vehicle;

generating the LDM data model representing the environment surrounding the vehicle based at least in part on an aggregation of the additional data collected from the plurality of sensors; and storing the LDM data model in memory.

3. The method of claim 1, further comprising:

in response to determining that a second misbehavior condition is not detected:
performing calculations based on at least one of observed dynamics of objects in the LDM data model or on new data input received from the V2X message;
modifying the LDM data model to incorporate the calculations and data included in a second V2X message; and
replacing the LDM data model maintained or stored in memory with the modified LDM data model.

4. The method of claim 1, wherein transmitting the generated misbehavior report to a misbehavior managing authority comprises transmitting a representation of the LDM data model.

5. The method of claim 4, wherein the representation of the LDM data model includes an incomplete data set for the LDM data model.

6. The method of claim 1, wherein the data regarding the environment surrounding the vehicle included in the received V2X message includes traffic information.

7. The method of claim 1, wherein the data regarding the environment surrounding the vehicle included in the received V2X message includes location information of neighboring vehicles based on global navigation satellite system data.

8. The method of claim 1, wherein the data regarding the environment surrounding the vehicle included in the received V2X message includes map data that specifies road geometry and street furniture.

9. The method of claim 1, wherein comparing data included in the received V2X message to the locally maintained or stored LDM data model to detect misbehavior conditions comprises determining whether any data included in the received V2X message conflicts with information in the locally maintained or stored LDM data model.

10. The method of claim 1, wherein comparing data included in the received V2X message to the locally maintained or stored LDM data model to detect misbehavior conditions comprises:
selecting a subset of data elements within the locally maintained or stored LDM data model for comparison to data included in the received V2X message; and
determining whether any data included in the received V2X message conflicts with the selected subset of data elements within the locally maintained or stored LDM data model.

11. The method of claim 1, wherein comparing data included in the received V2X message to the locally maintained or stored LDM data model to detect misbehavior conditions comprises determining whether status or location information of a neighboring vehicle that transmitted the received V2X message conflicts with status or location information of the neighboring vehicle in the locally maintained or stored LDM data model.

12. A vehicle-to-everything (V2X) processing device, comprising:

a processor configured with processor-executable instructions to:
receive a V2X message from another V2X system participant, wherein the V2X message contains data regarding an environment surrounding a vehicle in which the V2X processing device is installed;
compare data contained in the received V2X message to a locally maintained or stored local dynamic map (LDM) data model to detect misbehavior conditions;
generate a misbehavior report identifying a misbehavior condition in response to detecting the misbehavior condition based on the comparison;
transmit the generated misbehavior report to a misbehavior managing authority; and
receive feedback from the misbehavior managing authority, wherein the feedback includes corrective measures to mitigate the misbehavior condition.

13. The V2X processing device of claim 12, wherein the processor is further configured with processor-executable instructions to:
monitor a plurality of sensors in the vehicle to collect additional data regarding an environment surrounding the vehicle;
generate the LDM data model representing the environment surrounding the vehicle based at least in part on an aggregation of the additional data collected from the plurality of sensors; and
store the LDM data model in memory.

14. The V2X processing device of claim 12, wherein the processor is further configured with processor-executable instructions to:
perform calculations based on at least one of observed dynamics of objects in the LDM data model or on new data input received from the V2X message in response to determining that a second misbehavior condition is not detected;
modify the LDM data model to incorporate the calculations and data included in a second V2X message; and
replacing the LDM data model maintained or stored in memory with the modified LDM data model.

15. The V2X processing device of claim 12, wherein the processor is further configured with processor-executable instructions to include a representation of the LDM data model in the generated misbehavior report transmitted to the misbehavior managing authority.

16. The V2X processing device of claim 15, wherein the representation of the LDM data model includes an incomplete data set for the LDM data model.

17. The V2X processing device of claim 12, wherein the data regarding the environment surrounding the vehicle included in the received V2X message includes traffic information.

18. The V2X processing device of claim 12, wherein the data regarding the environment surrounding the vehicle included in the received V2X message includes location information of neighboring vehicles based on global navigation satellite system data.

19. The V2X processing device of claim 12, wherein the data regarding the environment surrounding the vehicle included in the received V2X message includes map data that specifies road geometry and street furniture.

20. The V2X processing device of claim 12, wherein to compare data included in the received V2X message to the locally maintained or stored LDM data model to detect misbehavior conditions the processor is further configured with processor-executable instructions to determine whether any data included in the received V2X message conflicts with information in the locally maintained or stored LDM data model.

21. The V2X processing device of claim 12, wherein to compare data included in the received V2X message to the locally maintained or stored LDM data model to detect misbehavior conditions the processor is further configured with processor-executable instructions to:
   select a subset of data elements within the locally maintained or stored LDM data model for comparison to data included in the received V2X message; and
   determine whether any data included in the received V2X message conflicts with the selected subset of data elements within the locally maintained or stored LDM data model.

22. The V2X processing device of claim 12, wherein to compare data included in the received V2X message to the locally maintained or stored LDM data model to detect misbehavior conditions the processor is further configured with processor-executable instructions to determine whether status or location information of a neighboring vehicle that transmitted the received V2X message conflicts with status or location information of the neighboring vehicle in the locally maintained or stored LDM data model.

23. A vehicle-to-everything (V2X) processing device, comprising:
   means for receiving a V2X message from another V2X system participant, wherein the V2X message contains data regarding an environment surrounding a vehicle in which the V2X processing device is installed;
   means for comparing data contained in the received V2X message to a locally maintained or stored local dynamic map (LDM) data model to detect misbehavior conditions;
   means for generating a misbehavior report identifying a misbehavior condition in response to detecting the misbehavior condition based on the comparison;
   means for transmitting the generated misbehavior report to a misbehavior managing authority; and
   means for receiving feedback from the misbehavior managing authority, wherein the feedback includes corrective measures to mitigate the misbehavior condition.

24. The V2X processing device of claim 23, further comprising:
   means for monitoring a plurality of sensors in the vehicle to collect additional data regarding an environment surrounding the vehicle;
   means for generating the LDM data model representing the environment surrounding the vehicle based at least in part on an aggregation of the additional data collected from the plurality of sensors; and
   means for storing the LDM data model.

25. The V2X processing device of claim 23, further comprising:
   means for performing calculations based on at least one of observed dynamics of objects in the LDM data model or on new data input received from the V2X message in response to determining that a second misbehavior condition is not detected;
   means for modifying the LDM data model to incorporate the calculations and data included in a second V2X message; and
   means for replacing the LDM data model maintained or stored in memory with the modified LDM data model.

26. The V2X processing device of claim 23, wherein means for transmitting the generated misbehavior report to a misbehavior managing authority comprises means for transmitting a representation of the LDM data model.

27. The V2X processing device of claim 23, wherein means for comparing data included in the received V2X message to the locally maintained or stored LDM data model to detect misbehavior conditions comprises means for determining whether any data included in the received V2X message conflicts with information in the locally maintained or stored LDM data model.

28. The V2X processing device of claim 23, wherein means for comparing data included in the received V2X message to the locally maintained or stored LDM data model to detect misbehavior conditions comprises:
   means for selecting a subset of data elements within the locally maintained or stored LDM data model for comparison to data included in the received V2X message; and
   means for determining whether any data included in the received V2X message conflicts with the selected subset of data elements within the locally maintained or stored LDM data model.

29. The V2X processing device of claim 23, wherein means for comparing data included in the received V2X message to the locally maintained or stored LDM data model to detect misbehavior conditions comprises means for determining whether status or location information of a neighboring vehicle that transmitted the received V2X message conflicts with status or location information of the neighboring vehicle in the locally maintained or stored LDM data model.

* * * * *